(12) United States Patent
Mori et al.

(10) Patent No.: US 7,847,040 B2
(45) Date of Patent: Dec. 7, 2010

(54) α-OLEFIN-BASED POLYMER COMPOSITION, MOLDED PRODUCT FORMED FROM THE COMPOSITION, AND NOVEL POLYMER

(75) Inventors: Ryoji Mori, Ichihara (JP); Takashi Nakagawa, Ichihara (JP); Shigenobu Ikenaga, Ichihara (JP); Hiromasa Marubayashi, Chigasaki (JP); Masahiko Okamoto, Chiba (JP); Yasushi Tohi, Ichihara (JP); Kouji Nagahashi, Kuga-gun (JP)

(73) Assignee: Mitsu Chemicals, Inc., Tokyo (JP)

( * ) Notice: Subject to any disclaimer, the term of this patent is extended or adjusted under 35 U.S.C. 154(b) by 943 days.

(21) Appl. No.: 11/578,972

(22) PCT Filed: Apr. 8, 2005

(86) PCT No.: PCT/JP2005/006938

§ 371 (c)(1),
(2), (4) Date: Oct. 18, 2006

(87) PCT Pub. No.: WO2005/103141

PCT Pub. Date: Nov. 3, 2005

(65) Prior Publication Data

US 2007/0225431 A1    Sep. 27, 2007

(30) Foreign Application Priority Data

| Apr. 19, 2004 | (JP) | ............................. 2004-122611 |
| Jul. 26, 2004 | (JP) | ............................. 2004-217730 |
| Aug. 10, 2004 | (JP) | ............................. 2004-233041 |
| Oct. 18, 2004 | (JP) | ............................. 2004-302872 |

(51) Int. Cl.
C08F 4/48 (2006.01)

(52) U.S. Cl. ...................................................... 526/170

(58) Field of Classification Search .................. 526/170
See application file for complete search history.

(56) References Cited

U.S. PATENT DOCUMENTS

| 3,758,643 | A | 9/1973 | Fischer |
| 3,862,106 | A | 1/1975 | Fischer |
| 4,130,535 | A | 12/1978 | Coran et al. |
| 4,212,787 | A | 7/1980 | Matsuda et al. |
| 4,247,952 | A | 1/1981 | Shibuya |
| 4,311,628 | A | 1/1982 | Abdou-Sabet et al. |
| 5,910,539 | A | 6/1999 | Matsunaga et al. |
| 6,191,219 | B1 | 2/2001 | Tanaka et al. |
| 2006/0247381 | A1 | 11/2006 | Mori et al. |

FOREIGN PATENT DOCUMENTS

| CN | 1302827 A | 7/2001 |
| EP | 0 936 247 A1 | 8/1999 |
| EP | 1 630 197 | 3/2006 |
| JP | 53-21021 | 6/1978 |
| JP | 54-114887 | 9/1979 |
| JP | 55-18448 | 5/1980 |
| JP | 56-020053 | 2/1981 |
| JP | 56-15741 | 4/1981 |
| JP | 56-15742 | 4/1981 |
| JP | 56-041238 | 4/1981 |
| JP | 58-46138 | 10/1983 |
| JP | 58-56575 | 12/1983 |
| JP | 59-30736 | 7/1984 |
| JP | 61-42626 | 9/1986 |
| JP | 62-938 | 1/1987 |
| JP | 62-59139 | 12/1987 |
| JP | 02-173111 | 7/1990 |
| JP | 2-274763 | 11/1990 |
| JP | 03-070713 | 3/1991 |
| JP | 3-200813 | 9/1991 |
| JP | 03-200813 | 9/1991 |

(Continued)

OTHER PUBLICATIONS

Coran, A. Y. et al., "Rubber-Thermoplastic Compositions. Part I. EPDM—Polypropylene Thermoplastic Vulcanizates", Rubber Chemistry and Technology, vol. 53, 1980, pp. 141-150.

(Continued)

Primary Examiner—Ling-Siu Choi
Assistant Examiner—Sonya Wright
(74) Attorney, Agent, or Firm—Foley & Lardner LLP

(57) ABSTRACT

A composition having excellent transparency, flexibility, rubber elasticity, thermal resistance, impact resistance, abrasion resistance and the like, a composition having excellent rigidity and impact resistance as well as excellently balanced in whitening resistance, abrasion resistance and heat sealability, and a composition having excellent rubbery properties, thermal resistance, abrasion resistance and flexibility are provided.

A composition comprising a specific propylene•α-olefin copolymer for which, in a signal chart measured by $^{13}$C-NMR and predetermined such that the peak present at the highest magnetic field among the signals originating from CH (methine) of the constituent unit derived from an α-olefin having 4 to 20 carbon atoms is to be at 34.4 ppm, an absorption intensity A at about 22.0 to 20.9 ppm and an absorption intensity B at about 19.0 to 20.6 ppm satisfy the following relational expressions (i) and (ii) with respect to an absorption intensity C at about 19.0 to 22.0 ppm, which is assignable to propylene methyl:

$$(A/C) \times 100 \leq 8 \quad \text{(i), and}$$

$$(B/C) \times 100 \geq 60 \quad \text{(ii),}$$

a molded product thereof, and the α-olefin-based copolymer are provided.

7 Claims, No Drawings

FOREIGN PATENT DOCUMENTS

| | | |
|---|---|---|
| JP | 7-149999 | 6/1995 |
| JP | 8-27353 | 1/1996 |
| JP | 8-238733 | 9/1996 |
| JP | 10-300084 | 11/1998 |
| JP | 2000-198893 | 7/2000 |
| JP | 2001-47577 | 2/2001 |
| WO | WO 91/06583 | 5/1991 |

OTHER PUBLICATIONS

European Search Report dated Feb. 23, 2009 based on corresponding European Application No. 05728526.4.

Chinese Office Action mailed Oct. 30, 2009, received in the corresponding Chinese application No. 2005800117743, including its translation.

α-OLEFIN-BASED POLYMER COMPOSITION, MOLDED PRODUCT FORMED FROM THE COMPOSITION, AND NOVEL POLYMER

TECHNICAL FIELD

The present invention relates to a resin composition comprising an α-olefin-based copolymer, a molded product formed from the composition, and a novel copolymer.

BACKGROUND ART

Thermoplastic resins, particularly polyolefins, are inexpensive and have excellent rigidity, resistance to moisture and thermal resistance. Thus, they are used in a wide range of applications such as materials for automobile, materials for household electric appliances and the like.

On the other hand, while a trend to avoid soft polyvinyl chloride is growing stronger owing to the problems of hormone-disrupting substance, dioxin and the like, preference is given to polyolefins, which have flexibility and transparency. Under such circumstances, thermoplastic polyolefin-based elastomers called TPOs have excellent flexibility but no transparency, while a system prepared by adding styrene-based elastomers to PP has flexibility and transparency but is poor in rubber elasticity and expensive, thus these systems being limited in applications (Patent Documents 1 to 11).

In addition, Patent Document 12 describes a propylene•ethylene•1-butene copolymer, but does not describe a material having excellent transparency and flexibility as well as rubber elasticity.

Moreover, polypropylene has been conventionally used in a wide range of applications as a thermoplastic molding material having excellent rigidity, thermal resistance, transparency and the like. This polypropylene, however, has poor flexibility and impact resistance, and thus, soft rubber components are usually blended with polypropylene.

As such, when soft rubber components are blended with polypropylene, polypropylene compositions having improved flexibility and impact resistance are obtained, but these compositions still have a problem of thermal resistance being deteriorated. These polypropylene compositions are also desired to have improvement in low temperature heat sealability.

Hence, there has been a demand for development of a polypropylene composition having excellent flexibility and impact resistance as well as excellent thermal resistance and low temperature heat sealability.

In addition, crystalline polypropylene has excellent mechanical properties such as tensile strength, rigidity, surface hardness, impact resistance and the like, optical properties such as gloss, transparency and the like, and food hygiene properties such as non-toxicity, odorlessness and the like, and is widely used particularly in the field of food packaging. However, the film of this crystalline polypropylene shrinks when heated to the heat sealing temperature, and it is difficult to heat seal with a single layer of this film. Thus, the crystalline polypropylene film is typically provided with a heat seal layer, and this heat seal layer is generally formed from a polymer such as a low density polyethylene, a propylene•ethylene random copolymer or the like.

Meanwhile, the polymer forming such heat seal layer is required to have some specific performances such as that: (1) heat sealing is possible at a much lower temperature than the base material (crystalline polypropylene film); (2) the heat seal strength is excellent, while the variation in the heat seal strength with time is small; (3) the adhesion with the base material is excellent; (4) transparency is excellent to a degree equivalent to or higher than that of the base material; (5) no blocking occurs during the storage; (6) the polymer does not adhere to a bag-making apparatus or a filling packaging machine; (7) scratch resistance is excellent; and the like.

However, conventionally known heat sealing materials do not satisfy all of these performances, and for example, the above-described low density polyethylene can be heat sealed at low temperatures, but it is poor in the heat seal strength, adhesion to the base material and transparency, and further presents problems such as liability to adhere to packaging machines, and the like.

Furthermore, propylene ethylene random copolymers satisfy the above-described performances (2) to (7), but do not satisfy the performance (1), and polypropylene composite film having a heat seal layer formed from a propylene•ethylene random copolymer has a narrow temperature width for heat sealing. Thus, if this composite film is to be heat sealed with use of an automatic packaging machine, an automatic bag-making machine or the like, the heat sealing temperature must be strictly controlled. Moreover, it has been proposed to use a blend of a propylene•ethylene random copolymer and an ethylene•α-olefin copolymer as a heat sealing material, and this blend has improved low heat sealability compared to propylene•ethylene random copolymers, but this blend is deteriorated in transparency.

Meanwhile, the Applicant of the present invention previously found that a propylene•1-butene random copolymer having a propylene content of 55 to 85% by weight and a heat of crystalline fusion of 20 to 80 J/g as measured by differential scanning calorimetry, has excellent transparency and good low temperature heat sealability, so that the copolymer is useful as a heat sealing material. And, the Applicant proposed the use of a composition comprising this propylene•1-butene random copolymer and an isotactic polypropylene, which containing the propylene•1-butene random copolymer in an amount of 50% by weight or more, as a heat seal layer for the polypropylene film (Patent Document 13). However, the heat seal layer formed from this composition has excellent low temperature heat sealability and anti-blocking properties, but is somehow poor in the anti-blocking properties and scratch resistance as compared with the above-mentioned propylene•ethylene random copolymer.

The same Applicant has also proposed a composite film having a heat seal layer for isotactic polypropylene, which is formed from a composition comprising a propylene•1-butene copolymer and a crystalline propylene•α-olefin random copolymer, and containing the propylene•1-butene copolymer in an amount of 10 to 40% by weight, as a composite film having excellent heat sealability (Patent Document 14).

However, such polypropylene film is further desired to have a property appropriate to be applied in high speed packaging, and is desired to have slip properties and anti-blocking properties, together with improved low temperature heat sealability.

JP-A-08-238733 discloses a composite film comprising a propylene•1-butene copolymer prepared with use of a metallocene catalyst, and a crystalline propylene•α-olefin random copolymer as a heat seal layer. However, there is a problem if the melting point of the propylene•1-butene copolymer is adjusted to near 70° C., the rate of crystallization is lowered, and the productivity is decreased. Furthermore, if the content of the propylene•1-butene copolymer is excessive, there occur problems such that it is likely to have poor moldability or deterioration in film appearance (Patent Document 15).

A crosslinked olefin-based thermoplastic elastomer is used as an energy and resource saving type elastomer, and is widely used in automobile parts, industrial machinery parts, electronic•electrical instrument parts, construction material and the like, particularly as a substitution of natural rubber.

The crosslinked olefin-based thermoplastic elastomer is widely known as is described in detail in the literature [A. Y. Coran et al., Rubber Chemistry and Technology, Vol. 53 (1980), p. 141] (Non-Patent Document 1).

Meanwhile, a non-crosslinked or partially crosslinked olefin-based thermoplastic elastomer is described in, for example, the above-mentioned Patent Documents 1 to 9.

Although the non-crosslinked or partially crosslinked thermoplastic elastomer has excellent rubbery properties (permanent elongation, permanent compression set, etc.), heat resistance and the like, but the elastomer has poor abrasion resistance and scratch resistance, so that the substitution for soft polyvinyl chloride is not achieved. Thus, there has been a demand for an olefin-based thermoplastic elastomer composition having excellent abrasion resistance and scratch resistance, which can substitute soft polyvinyl chloride without involving environmental problems, waste treatment problems and the like.

[Patent Document 1] JP-B-53-21021
[Patent Document 2] JP-B-55-18448
[Patent Document 3] JP-B-56-15741
[Patent Document 4] JP-B-56-15742
[Patent Document 5] JP-B-58-46138
[Patent Document 6] JP-B-58-56575
[Patent Document 7] JP-B-59-30376
[Patent Document 8] JP-B-62-938
[Patent Document 9] JP-B-62-59139
[Patent Document 10] JP-A-7-149999
[Patent Document 11] JP-A-8-27353
[Patent Document 12] JP-A-3-200813
[Patent Document 13] JP-A-54-114887
[Patent Document 14] JP-B-61-42626
[Patent Document 15] JP-A-08-238733
[Non-Patent Document 1] Rubber Chemistry and Technology, Vol. 53 (1980), p. 141

DISCLOSURE OF THE INVENTION

Problems to be Solved by the Invention

It is a first object of the present invention to provide a thermoplastic resin composition having improved properties that are selected from transparency, flexibility, rubber elasticity, thermal resistance, abrasion resistance and the like, and a molded product formed from the composition.

The present invention is also to provide an α-olefin-based copolymer which can give a thermoplastic resin composition having excellent transparency, flexibility, rubber elasticity, thermal resistance, abrasion resistance and the like.

It is a second object of the present invention to provide a polypropylene resin composition having excellent rigidity and impact resistance as well as being excellently balanced in the whitening resistance, abrasion resistance and heat sealability.

It is a third object of the present invention to provide a propylene-based polymer composition which retains the performances of conventional non-crosslinked or partially crosslinked thermoplastic elastomers, while having excellent abrasion resistance and flexibility.

MEANS FOR SOLVING THE PROBLEMS

The present invention provides a thermoplastic resin composition having improved properties based on an improvement in the properties of a thermoplastic resin by blending an α-olefin-based copolymer (S) to the thermoplastic resin, and a molded product obtained therefrom, and is further intended to provide such an α-olefin-based copolymer.

The present invention provides a thermoplastic resin composition comprising an α-olefin-based copolymer (I) which comprises 1 to 30% by mole of an ethylene-derived constituent unit, 30 to 79% by mole of a propylene-derived constituent unit, and 10-50% by mole of a constituent unit derived from an α-olefin having 4 to 20 carbon atoms (provided that the total amount of the ethylene-derived constituent unit and the constituent unit derived from an α-olefin having 4 to 20 carbon atoms is 21 to 70% by mole), and for which, in a signal chart measured by $^{13}$C-NMR in an o-dichlorobenzene solution and predetermined such that the peak present at the highest magnetic field among the signals originating from CH (methine) of the constituent unit derived from an α-olefin having 4 to 20 carbon atoms is to be at 34.4 ppm, an absorption intensity A at about 22.0 to 20.9 ppm and an absorption intensity B at about 19.0 to 20.6 ppm satisfy the following relational expressions (i) and (ii) with respect to the absorption intensity C at about 19.0 to 22.0 ppm, which is assignable to propylene methyl:

$$(A/C) \times 100 \leq 8 \quad \text{(i)}$$

$$(B/C) \times 100 \geq 60 \quad \text{(ii), and}$$

an other thermoplastic resin (II); and a molded product obtained therefrom.

In another embodiment of the present invention, there are provided a thermoplastic resin composition comprising an α-olefin-based copolymer (I') which is obtained by polymerizing ethylene, propylene and an α-olefin having 4 to 20 carbon atoms in the presence of a catalyst containing a transition metal compound represented by the following formula (1), and which comprises 1 to 30% by mole of an ethylene-derived constituent unit, 30 to 79% by mole of a propylene-derived constituent unit, and 10 to 50% by mole of a constituent unit derived from an α-olefin having 4 to 20 carbon atoms (provided that the total amount of the ethylene-derived constituent unit and the constituent unit derived from an α-olefin having 4 to 20 carbon atoms is 21 to 70% by mole), and an other thermoplastic resin (II); and a molded product obtained therefrom.

(1)

wherein M is Ti, Zr, Hf, Rn, Nd, Sm or Ru; Cp$^1$ and Cp$^2$, which are different from each other, are each a cyclopentadienyl group, an indenyl group, a fluorenyl group, or a derivative group thereof, which are π-bonded to M; X$^1$ and X$^2$ are each an anionic ligand or a neutral Lewis base ligand; and Z is a C, O, B, S, Ge, Si or Sn atom, or a group containing these atoms.

The above-described thermoplastic resin composition wherein the α-olefin-based copolymer (I) or the α-olefin-based copolymer (I') is an α-olefin-based copolymer having no melting peak as measured by differential scanning calorimetry (DSC), and having an intrinsic viscosity [η] in the range of 0.01 to 10 dl/g as measured at 135° C. in decalin, a molecular weight distribution of 4 or less as determined by GPC, and a glass transition temperature Tg of −5° C. or lower; and a molded product obtained therefrom are preferred embodiments of the present invention.

The present invention provides an α-olefin-based copolymer (I) and an α-olefin-based copolymer (I') having the characteristics as described above, as novel α-olefin-based copolymers.

The present invention also provides a polypropylene resin composition comprising 50 to 99.8% by weight of a propylene-based polymer (A), and 0.2 to 50% by weight of a propylene•α-olefin copolymer (B), which comprises 90 to 40% by mole of a propylene-derived constituent unit, and 10 to 60% by mole of a constituent unit derived from an α-olefin having 2 to 20 carbon atoms except propylene, and for which, in a signal chart measured by $^{13}$C-NMR in an o-dichlorobenzene solution and predetermined such that the peak present at the highest magnetic field among the signals originating from CH (methine) of the constituent unit derived from an α-olefin having 4 to 20 carbon atoms is to be at 34.4 ppm, an absorption intensity A at about 22.0 to 20.9 ppm and an absorption intensity B at about 19.0 to 20.6 ppm satisfy the following relational expressions (i) and (ii) with respect to the absorption intensity C at about 19.0 to 22.0 ppm, which is assignable to propylene methyl:

$$(A/C) \times 100 \leq 8 \tag{i, and}$$

$$(B/C) \times 100 \geq 60 \tag{ii};$$

and a molded product obtained therefrom.

In another embodiment of the present invention, there is provided a polypropylene resin composition comprising 50 to 99.8% by weight of a propylene-based polymer (A), and 0.2 to 50% by weight of a propylene•α-olefin copolymer (BB) (provided that propylene•ethylene binary copolymers are excluded), which is obtained by polymerizing propylene and an α-olefin having 2 to 20 carbon atoms (provided that propylene is excluded) in the presence of a catalyst containing a transition metal compound represented by the above formula (1), and which comprises 90 to 40% by mole of a propylene-derived constituent unit and 10 to 60% by mole of a constituent unit derived from an α-olefin having 2 to 20 carbon atoms except propylene.

The present invention also provides a propylene-based copolymer composition comprising 30 to 80 parts by weight of a non-crosslinked or partially crosslinked olefin-based thermoplastic elastomer (X), 0 to 40 parts by weight of a propylene-based polymer (Y), and 5 to 60 parts by weight of a propylene•α-olefin copolymer (Z) which comprises 30 to 80% by mole of a propylene-derived constituent unit, 0 to 30% by mole of an ethylene-derived constituent unit, and 10 to 50% by mole of a constituent unit derived from an α-olefin having 4 to 20 carbon atoms (wherein the total amount of the propylene-derived constituent unit, the ethylene-derived constituent unit and the constituent unit derived from an α-olefin having 4 to 20 carbon atoms is 100% by mole), and for which, in a signal chart measured by $^{13}$C-NMR in an o-dichlorobenzene solution and predetermined such that the peak present at the highest magnetic field among the signals originating from CH (methine) of the constituent unit derived from an α-olefin having 4 to 20 carbon atoms is to be at 34.4 ppm, an absorption intensity A at about 22.0 to 20.9 ppm and an absorption intensity B at about 19.0 to 20.6 ppm satisfy the following relational expressions (i) and (ii) with respect to an absorption intensity C at about 19.0 to 22.0 ppm, which is assignable to propylene methyl:

$$(A/C) \times 100 \leq 8 \tag{i, and}$$

$$(B/C) \times 100 \geq 60 \tag{ii},$$

provided that the total of (X), (Y) and (Z) is 100 parts by weight; and a molded product obtained therefrom.

In another embodiment of the present invention, there are provided a propylene-based copolymer composition comprising 30 to 80 parts by weight of a non-crosslinked or partially crosslinked olefin-based thermoplastic elastomer (X), 0 to 40 parts by weight of a propylene-based polymer (Y), and 5 to 60 parts by weight of a propylene•α-olefin copolymer (ZZ), which is obtained by polymerizing propylene and an α-olefin having 4 to 20 carbon atoms (provided that propylene is excluded), and ethylene if necessary, in the presence of a catalyst containing a transition metal compound represented by the above formula (1), and which comprises 30 to 80% by mole of a propylene-derived constituent unit, 0 to 30% by mole of an ethylene-derived constituent unit, and 10 to 50% by mole of a constituent unit derived from an α-olefin having 4 to 20 carbon atoms (wherein the total amount of the propylene-derived constituent unit, the ethylene-derived constituent unit, and the constituent unit derived from an α-olefin having 4 to 20 carbon atoms is 100% by mole), provided that the total of (X), (Y) and (ZZ) is 100 parts by weight, and a molded product obtained therefrom.

EFFECT OF THE INVENTION

According to the present invention, there are provided a thermoplastic resin composition being excellently balanced in transparency, flexibility, rubber elasticity, thermal resistance and abrasion resistance, and a molded product obtained therefrom.

According to the present invention, there is also provided an α-olefin-based copolymer which can provide a thermoplastic resin composition excellently balanced in transparency, flexibility, thermal resistance and abrasion resistance when blended with a thermoplastic resin.

Furthermore, according to the present invention, there is also provided a polypropylene resin composition having excellent rigidity and impact resistance, as well as being excellently balanced in the whitening resistance, abrasion resistance and heat sealability.

Furthermore, according to the present invention, there is provided a propylene-based copolymer composition having excellent rubbery properties (permanent elongation, permanent compression set, etc.), thermal resistance and the like, as well as excellent abrasion resistance and scratch resistance.

BEST MODE FOR CARRYING OUT THE INVENTION

The present invention is to provide a thermoplastic resin composition having improved properties based on an improvement of the properties of a thermoplastic resin by blending an α-olefin-based copolymer (S) to the thermoplastic resin, and a molded product obtained therefrom, and also to provide such an α-olefin-based copolymer.

First Specific Example of the Invention

As a first specific example of the thermoplastic resin composition having improved properties, in which an α-olefinbased copolymer (S) is blended with a thermoplastic resin, as provided by the present invention, the following resin composition may be mentioned.

That is, a thermoplastic resin composition comprising an α-olefin-based copolymer (I) which comprises 1 to 30% by mole of an ethylene-derived constituent unit, 30 to 79% by mole of a propylene-derived constituent unit, and 10 to 50% by mole of a constituent unit derived from an α-olefin having 4 to 20 carbon atoms (provided the total amount of the ethylene-derived constituent unit and a constituent unit derived from an α-olefin having 4 to 20 carbon atoms is 21 to 70% by mole), and for which, in a signal chart measured by $^{13}$C-NMR in an o-dichlorobenzene solution and predetermined such that the peak present at the highest magnetic field among the signals originating from CH (methine) of the constituent unit derived from an α-olefin having 4 to 20 carbon atoms is to be at 34.4 ppm, an absorption intensity A at about 22.0 to 20.9 ppm and an absorption intensity B at about 19.0 to 20.6 ppm satisfy the following relational expressions (i) and (ii) with respect to the absorption intensity C at about 19.0 to 22.0 ppm, which is assignable to propylene methyl:

$(A/C) \times 100 \leq 8$            (i)

$(B/C) \times 100 \geq 60$            (ii), and an other thermoplastic resin (II) may be mentioned.

In another embodiment of the present invention, a thermoplastic resin composition comprising an α-olefin-based copolymer (I') which is obtained by polymerizing ethylene, propylene and an α-olefin having 4 to 20 carbon atoms in the presence of a catalyst containing a transition metal compound represented by the following formula (1), and which comprises 1 to 30% by mole of an ethylene-derived constituent unit, 30 to 79% by mole of a propylene-derived constituent unit, and 10 to 50% by mole of a constituent unit derived from α-olefin having 4 to 20 carbon atoms (provided that the total amount of the ethylene-derived constituent unit and the constituent unit derived from α-olefin having 4 to 20 carbon atoms is 21 to 70% by mole), and an other thermoplastic resin (II):

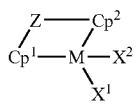
(1)

wherein M is Ti, Zr, Hf, Rn, Nd, Sm or Ru; $Cp^1$ and $Cp^2$, which are different from each other, are each a cyclopentadienyl group, an indenyl group, a fluorenyl group or a derivative group thereof, which are π-bonded to M; $X^1$ and $X^2$ are each an anionic ligand or a neutral Lewis base ligand; and Z is a C, O, B, S, Ge, Si or Sn atom, or a group containing these atoms.

The components constituting such thermoplastic resin compositions will be described in the following.

α-Olefin-Based Copolymer (I)

First, the α-olefin-based copolymer (I) will be explained.

For the α-olefin-based copolymer (I) according to the present invention, the signal intensities measured by $^{13}$C-NMR satisfy the relationships as follows. That is, In a signal chart measured by $^{13}$C-NMR in an o-dichlorobenzene solution and predetermined such that the peak present at the highest magnetic field among the signals originating from CH (methine) of the constituent unit derived from an α-olefin having 4 to 20 carbon atoms is to be at 34.4 ppm, an absorption intensity A at about 22.0 to 20.9 ppm and an absorption intensity B at about 19.0 to 20.6 ppm satisfy the following relational expressions (i) and (ii), preferably the relational expressions (i)' and (ii)', and more preferably the relational expressions (i)" and (ii)", with respect to the absorption intensity C at about 19.0 to 22.0 ppm, which is assignable to propylene methyl $(A/C) \times 100 \leq 8$            (i)

$(B/C) \times 100 \geq 60$            (ii)

$(A/C) \times 100 \leq 7$            (i)'

$(B/C) \times 100 \geq 64$            (ii)'

$(A/C) \times 100 \leq 6$            (i)"

$(B/C) \times 100 \geq 68$            (ii)"

In addition, this structure is measured as follows. That is, 50 mg of a sample is dissolved in about 0.5 ml of a solvent mixture of o-dichlorobenzene/deuterated benzene=5/1, and this solution is subjected to $^{13}$C-NMR measurement at 120° C. using an EX-400 NMR measuring apparatus manufactured by JEOL, Ltd. in the single proton pulse decoupling measurement mode, at a pulse width of 4.7 μs, a pulse interval of 5.5 s, and within an observation range of 180 ppm, while predetermining the peak present at the highest magnetic field among the signals originating from CH (methine) of the constituent unit derived from an α-olefin having 4 to 20 carbon atoms to be at 34.4 ppm, as the chemical shift standard. The number of integration is 10,000 times or more. Moreover, in the case of a copolymer containing a 1-butene-derived constituent unit, the peak present at the highest magnetic field among the signals originating from CH (methine) of the 1-butene-derived constituent unit is to be at 34.4 ppm. If the α-olefin-based copolymer (I) is within such range, the copolymer tends to be excellent in syndiotacticity and to have excellent transparency, flexibility and abrasion resistance. It is preferable that the α-olefin having 4 to 20 carbon atoms in the α-olefin-based copolymer (I) is 1-butene.

The α-olefin-based copolymer (I) according to the present invention comprises 1 to 30% by mole of an ethylene-derived constituent unit, 30 to 79% by mole of a propylene-derived constituent unit, and 10 to 50% by mole of a constituent unit derived from an α-olefin having 4 to 20 carbon atoms (wherein the total amount of the ethylene-derived constituent unit and the constituent unit derived from an αolefin having 4 to 20 carbon atoms is 21 to 70% by mole, based on 100% by mole of the total of the ethylene-derived constituent unit, the propylene-derived constituent unit and the constituent unit derived from an α-olefin having 4 to 20 carbon atoms in the copolymer (I)); preferably 3 to 25% by mole of an ethylene-derived constituent unit, 35 to 75% by mole of a propylene-derived constituent unit, and 20 to 45% by mole of a constituent unit derived from an α-olefin having 4 to 20 carbon atoms (wherein the total amount of the ethylene-derived constituent unit and the constituent unit derived from an α-olefin having 4 to 20 carbon atoms is 25 to 65% by mole, based on 100% by mole of the total of the ethylene-derived constituent unit, the propylene-derived constituent unit and the constituent unit derived from an α-olefin having 4 to 20 carbon atoms in the copolymer (I)); particularly preferably 3 to 25% by mole of an ethylene-derived constituent unit, 35 to 65% by mole of a propylene-derived constituent unit, and 20 to 45% by mole of a constituent unit derived from an α-olefin having 4 to 20 carbon atoms (wherein the total amount of the ethylene-derived constituent unit and the constituent unit derived from an α-olefin having 4 to 20 carbon atoms is 35 to 65% by mole, based on 100% by mole of the total of the ethylene-derived constituent unit, the propylene-derived constituent unit and the constituent unit derived from an α-olefin having 4 to 20 carbon atoms in the copolymer (I)); and even more preferably 5 to 25% by mole of an ethylene-derived constituent unit, 40 to 65% by mole of a propylene-derived constituent unit, and 20 to 40% by mole of a constituent unit derived from an α-olefin having 4 to 20 carbon atoms (wherein the total amount of the ethylene-derived constituent unit and the constituent unit derived from an αolefin having 4 to 20 carbon atoms is 35 to 60% by mole, based on 100% by mole of the total of the ethylene-derived constituent unit, the propylene-derived constituent unit and the constituent unit derived from an α-olefin having 4 to 20 carbon atoms in the copolymer (I)). An α-olefin-based copolymer (I) comprising the ethylene-derived constituent unit, the propylene-derived constituent unit and the constituent unit derived from an α-olefin having 4 to 20 carbon atoms in such amounts has good compatibility with a thermoplastic resin, and the resulting α-olefin-based copolymer tends to exhibit sufficient transparency, flexibility, rubber elasticity and abrasion resistance.

A novel α-olefin-based copolymer (I-a) of the present invention comprises 1 to 30% by mole of an ethylene-derived constituent unit, 30 to 69% by mole of a propylene-derived constituent unit, and 10 to 50% by mole of a constituent unit derived from an α-olefin having 4 to 20 carbon atoms (A) (wherein the total amount of the ethylene-derived constituent unit and the constituent unit derived from an α-olefin having 4 to 20 carbon atoms is 31 to 70% by mole, based on 100% by mole of the total of the ethylene-derived constituent unit, the propylene-derived constituent unit and the constituent unit derived from an α-olefin having 4 to 20 carbon atoms in the copolymer (I-a)); preferably 3 to 25% by mole of an ethylene-derived constituent unit, 35 to 65% by mole of a propylene-derived constituent unit, and 20 to 45% by mole of a constituent unit derived from an α-olefin having 4 to 20 carbon atoms (A) (wherein the total amount of the ethylene-derived constituent unit and the constituent unit derived from an α-olefin having 4 to 20 carbon atoms is 35 to 65% by mole, based on 100% by mole of the total of the ethylene-derived constituent unit, the propylene-derived constituent unit and the constituent unit derived from an α-olefin having 4 to 20 carbon atoms in the copolymer (I-a)); and more preferably 5 to 25% by mole of an ethylene-derived constituent unit, 40 to 65% by mole of a propylene-derived constituent unit, and 20 to 40% by mole of a constituent unit derived from an α-olefin having 4 to 20 carbon atoms (A) (wherein the total amount of the ethylene-derived constituent unit and the constituent unit derived from an α-olefin having 4 to 20 carbon atoms is 35 to 60% by mole, based on 100% by mole of the total of the ethylene-derived constituent unit, the propylene-derived constituent unit and the constituent unit derived from an α-olefin having 4 to 20 carbon atoms in the copolymer (I-a)).

If the composition is within this range, the copolymer has particularly good compatibility with a thermoplastic resin, and the resulting α-olefin-based copolymer (I-a) tends to exhibit sufficient transparency, flexibility, rubber elasticity and abrasion resistance. Further, the α-olefin-based copolymer (I-a) is included in the above-described α-olefin-based copolymer (I).

The α-olefin used for the preparation of such α-olefin-based copolymer (I) is not particularly limited so long as the carbon number is in the range of 4 to 20, preferably 4 to 12, and may be straight-chained or branched.

Specific examples of such α-olefin include 1-butene, 2-butene, 1-pentene, 1-hexene, 1-heptene, 1-octene, 1-nonene, 1-decene, 1-undecene, 1-dodecene, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene and the like, and 1-butene, 1-hexene, 1-octene, 1-decene and 4-methyl-1-pentene are preferred, with 1-butene, 1-hexene, 1-octene and 1-decene being more preferred, and 1-butene being particularly preferred. These α-olefins can be used individually or in combination of two or more kinds. For example, one α-olefin (p) selected from the α-olefins having 4 to 20 carbon atoms and another α-olefin (q), which is different from the above, and selected from the α-olefins having 4 to 20 carbon atoms, can be used at an amount ratio of (p)/(q)=(50 to 99% by mole)/(1 to 50% by mole)[(p)+(q)=100% by mole].

In this α-olefin-based copolymer (I), a constituent unit derived from an aromatic vinyl compound such as styrene or the like, a constituent unit derived from the polyene-based unsaturated compound (polyene) having two or more double bonds, a constituent unit formed from an alcohol, a carboxylic acid, an amine, or a derivative thereof, or the like may be also contained in addition to the α-olefin-derived constituent units. An embodiment not containing any constituent unit other than ethylene, propylene and the α-olefin having 4 to 20 carbon atoms is also a preferred embodiment.

For the α-olefin-based copolymer (I), the intrinsic viscosity [η] measured at 135° C. in decalin is desirable usually in the range of 0.01 to 10 dl/g, and preferably 0.05 to 10 dl/g. If the intrinsic viscosity [η] of the α-olefin-based copolymer (I) is within the above-mentioned range, an αolefin-based copolymer having excellent properties such as weather resistance, ozone resistance, resistance to thermal aging, low-temperature properties, resistance to dynamic fatigue and the like is obtained.

It is desirable that this α-olefin-based copolymer (I) has a single glass transition temperature, and that the glass transition temperature Tg measured by differential scanning calorimetry (DSC) is usually −5° C. or lower, preferably −10° C. or lower, and particularly preferably −15° C. or lower. When the glass transition temperature Tg of the α-olefin-based copolymer (I) is within the above-mentioned range, the copolymer has excellent cold resistance and low-temperature properties.

The molecular weight distribution (Mw/Mn, in terms of polystyrene, Mw: weight average molecular weight, Mn: number average molecular weight) measured by GPC is preferably 4.0 or less, and more preferably 1.5 to 3.0. Within this range, transparency, scratch resistance and impact resistance become good, and it is preferable. Furthermore, it is preferable that a melting peak measured by differential scanning calorimetry (DSC) does not exist. In this case, flexibility, scratch resistance, transparency and whitening resistance are excellent.

Production of α-Olefin-Based Copolymer (I)

Such α-olefin-based copolymer (I) can be obtained by copolymerizing propylene, ethylene and an α-olefin in the presence of a metallocene catalyst described in the following.

For such metallocene catalyst, at least one catalyst system comprising:

(a) a transition metal compound represented by the following formula (1), and (b) at least one compound selected from (b-1) a compound reacting the transition metal M in the transition metal compound (a) and forming an ionic complex,
(b-2) an organoaluminum oxy-compound and
(b-3) an organoaluminum compound may be mentioned:

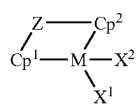
(1)

wherein M is Ti, Zr, Hf, Rn, Nd, Sm or Ru; $Cp^1$ and $Cp^2$, which are each a cyclopentadienyl group, an indenyl group, a fluorenyl group or a derivative group thereof, and are π-bonded to M; $X^1$ and $X^2$ are each an anionic ligand or a neutral Lewis base ligand; and Z is a C, O, B, S, Ge, Si or Sn atom, or a group containing these atoms.

Among the transition metal compounds represented by the above formula (1), a transition metal compound in which $Cp^1$ and $Cp^2$ are different groups may be mentioned, and more preferably, a transition metal compound in which either group of $Cp^1$ and $Cp^2$ is a cyclopentadienyl group or a derivative group thereof, and the other group is a fluorenyl group or a derivative group thereof, may be mentioned. Among these, such a compound in which either group of $Cp^1$ and $Cp^2$ is a cyclopentadienyl group or a derivative group thereof, and the other group is a fluorenyl group or a derivative group, is preferred.

According to the present invention, for the catalyst for the preparation of the α-olefin copolymer (I), a metallocene catalyst as described above is favorably used, but optionally, a titanium-based catalyst comprising a conventionally known solid titanium catalyst component and an organoaluminum compound, or a vanadium-based catalyst comprising a soluble vanadium compound and an organoaluminum compound can be also used.

In the present invention, ethylene, propylene and an α-olefin are usually copolymerized in the liquid phase, preferably in the presence of a metallocene catalyst as described above. At this time, a hydrocarbon solvent is used in general, but propylene may be used as a solvent. Copolymerization can be carried out by any of batch or continuous method.

In the case of conducting copolymerization by the batch method using a metallocene catalyst, the transition metal compound (a) in the polymerization system is used in an amount of usually 0.00005 to 1 mmol, preferably 0.0001 to 0.5 mmol, per 1 liter of the polymerization volume.

The ionized ionic compound (b-1) is used in an amount such that the molar ratio of the ionized ionic compound to the transition metal compound (a) ((b-1)/(a)) is 0.5 to 20, and preferably 1 to 10.

The organoaluminum oxy-compound (b-2) is used in an amount such that the molar ratio of aluminum atoms (Al) to the transition metal atom (M) in the transition metal compound (a) (Al/M) is 1 to 10000, and preferably 10 to 5000. Further, the organoaluminum compound (b-3) is used in an amount of usually about 0 to 5 mmol, preferably about 0 to 2 mmol, per 1 liter of the polymerization volume.

The copolymerization reaction is carried out at a temperature in the range of usually −20 to 150° C., preferably 0 to 120° C., and more preferably 0 to 100° C., and at a pressure in the range of more than 0 to 80 kg/cm², and preferably more than 0 to 50 kg/cm².

The reaction time (the average residence time, if polymerization is conducted by the continuous method) varies depending on the conditions such as the catalyst concentration, polymerization temperature or the like, but is usually 5 minutes to 3 hours, and preferably 10 minutes to 1.5 hours.

The ethylene, propylene and the α-olefin are respectively fed to the polymerization system in an amount such that an α-olefin copolymer (I) of the specific composition as described above is obtained. During the copolymerization, a molecular weight modifier such as hydrogen or the like can be also used. When the ethylene, propylene and the α-olefin are copolymerized as described above, the α-olefin copolymer (I) is usually obtained as a polymerization liquid containing the copolymer. This polymerization liquid is treated by conventional methods to obtain the α-olefin copolymer (I).

α-Olefin-based Polymer (I')

The α-olefin-based polymer (I') of the present invention is an α-olefin-based copolymer (I') which comprises 1 to 30% by mole of an ethylene-derived constituent unit, 30 to 79% by mole of a propylene-derived constituent unit, and 10 to 50% by mole of a constituent unit derived from an α-olefin having 4 to 20 carbon atoms (provided that the total amount of the ethylene-derived constituent unit and the constituent unit derived from an α-olefin having 4 to 20 carbon atoms is 21 to 70% by mole), and which is obtained by polymerizing ethylene, propylene and an α-olefin having 4 to 20 carbon atoms in the presence of a catalyst containing a transition metal compound represented by the following formula (1):

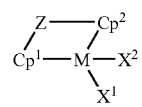
(1)

wherein M is Ti, Zr, Hf, Rn, Nd, Sm or Ru; $Cp^1$ and $Cp^2$, which are different from each other, are each a cyclopentadienyl group, an indenyl group, a fluorenyl group or a derivative group thereof, which are π-bonded to M; $X^1$ and $X^2$ are each an anionic ligand or a neutral Lewis base ligand; and Z is a C, O, B, S, Ge, Si or Sn atom, or a group containing these atoms.

The α-olefin to be used, amount ratio, other components, [η], Tg, Mw/Mn, the presence or absence of a melting peak, the catalyst containing a transition metal compound (I), and the like will not be described in order to avoid redundancy, but are the same as those for the α-olefin-based copolymer (I).

The α-olefin-based polymer (I'-a) of the present invention is included in (I'), and comprises 1 to 30% by mole of an ethylene-derived constituent unit, 30 to 69% by mole of a propylene-derived constituent unit, and 10 to 50% by mole of a constituent unit derived from an α-olefin having 4 to 20 carbon atoms (A) (the total amount of the ethylene-derived constituent unit and the constituent unit derived from an α-olefin having 4 to 20 carbon atoms is 31 to 70% by mole based on 100% by mole of the total of the ethylene-derived constituent unit, the propylene derived constituent unit and the constituent unit derived from an α-olefin having 4 to 20 carbon atoms in the copolymer (I'-a)). The preferred amount ratio of each constituent unit is not described for the reason of redundancy, but will be the same as that of the above-described copolymer (I'-a).

The α-olefin-based copolymer (I) or (I') according to the present invention has a JIS A hardness of 90 or less, preferably 80 or less, and a tensile modulus of 100 MPa or less, preferably 70 MPa or less, and a gloss change rate, ΔGloss, is 60% or less, and preferably 50% or less.

These properties are measured by forming a press sheet. A sheet having a thickness corresponding to the measurement items is produced under the following molding conditions of molding under pressure (100 kg/cm$^2$) for 2 minutes after preheating at 190° C., and cooling under pressure (100 kg/cm$^2$) at 20° C. for 5 minutes. The testing is performed by the methods described below in Examples.

Thermoplastic Resin (II)

For the other thermoplastic resin, in addition to the α-olefin-based copolymer (I) or the α-olefin-based copolymer (I') according to the present invention, any thermoplastic resin having a melting point of 50° C. or higher, preferably 80° C. or higher, or having a glass transition temperature of 40° C. or higher, preferably 80° C. or higher, in the case of not having a melting point, can be used without particular limitation. Further, in accordance with the purpose, a resin having high elastic modulus (thermoplastic resin (IIa)) and a resin having low elastic modulus (thermoplastic resin (IIb)) can be used under appropriate distinction, as the thermoplastic resin.

Thermoplastic Resin (IIa)

For the thermoplastic resin according to the present invention, a thermoplastic resin having an elastic modulus of 800 MPa or greater, preferably 1000 MPa or greater, is used, and for example, crystalline thermoplastic resins such as polyolefins, polyamides, polyesters, polyacetals and the like; and non-thermoplastic resins such as polystyrene, acrylonitrile-butadiene-styrene copolymers (ABS), polycarbonates, polyphenylene oxide and the like are used. The elastic modulus can be determined by press molding the thermoplastic resin, and then performing a tensile test by the method described below in the Examples. For the test, 1 mm-thick sheet is formed under the molding conditions of preheating at an appropriate temperature between 200 and 300° C., which is above any higher temperature between the melting point and the glass transition temperature as measured by DSC, then molding under pressure (100 kg/cm$^2$) for 3 minutes, and then cooling under pressure (100 kg/cm$^2$) at 20° C. for 5 minutes. For example, in the case of polypropylene to be described later, molding is carried out by preheating at 200° C., then pressurizing for 3 minutes, and cooling for 5 minutes.

Examples of the polyolefin include olefin homopolymers such as polyethylene, polypropylene, poly-1-butene, polymethylpentene, polymethylbutene and the like; olefin copolymers such as propylene•ethylene random copolymers and the like; and the like, while polypropylene, poly-1-butene and polymethylpentene are preferred.

Examples of the polyester include aromatic polyesters such as polyethylene terephthalate, polyethylene naphthalate, polybutylene terephthalate and the like, polycaprolactone, polyhydroxybutyrate and the like, while polyethylene terephthalate is particularly preferred.

Examples of the polyamide include aliphatic polyamides such as nylon-6, nylon-66, nylon-10, nylon-12, nylon-46 and the like; aromatic polyamides prepared from aromatic dicarboxylic acids and aliphatic diamines; and the like, while nylon-6 is particularly preferred.

Examples of the polyacetal include polyformaldehyde (polyoxymethylene), polyacetaldehyde, polypropionaldehyde, polybutylaldehyde and the like, while polyformaldehyde is particularly preferred.

The polystyrene may be a homopolymer of styrene, or may be a binary copolymer of styrene with acrylonitrile, methyl methacrylate or α-methylstyrene.

For the ABS, one containing 20 to 35% by mole of an acrylonitrile-derived constituent unit, 20 to 30% by mole of a butadiene-derived constituent unit, and 40 to 60% by mole of a styrene-derived constituent unit is preferably used.

Examples of the polycarbonate include those obtained from bis(4-hydroxyphenyl)methane, 1,1-bis(4-hydroxyphenyl)ethane, 2,2-bis(4-hydroxyphenyl)propane, 2,2-bis(4-hydroxyphenyl)butane and the like, while a polycarbonate obtained from 2,2-bis(4-hydroxyphenyl)propane is particularly preferred.

For the polyphenylene oxide, it is preferable to use poly(2, 6-dimethyl-1,4-phenylene oxide).

Among these thermoplastic resins, polyolefins are preferred, and a polymer mainly comprising polypropylene, polybutene or polymethylpentene is more preferred, with a polypropylene having a melt flow rate of 0.1 to 200 g/10 min as measured at 230° C. under a load of 2.16 kg being most preferred.

For the polypropylene, both isotactic polypropylene and syndiotactic polypropylene are used, but isotactic polypropylene has thermal resistance and is preferred. For the isotactic polypropylene, homopolypropylene, random polypropylene and block polypropylene are all suitably used.

The thermoplastic resins as described above may be used individually or in combination of two or more kinds. Furthermore, thermoplastic resins other than those may be also used together with the above-mentioned thermoplastic resins.

Thermoplastic Resin (IIb)

For the thermoplastic resin according to the present invention, a thermoplastic resin having an elastic modulus of less than 800 MPa, preferably less than 700 MPa, is used, and for example, polyolefins, soft polyvinyl chloride, polyamide elastomers, polyester elastomers, and polyurethane elastomers are used.

Among these, polyolefins are most preferred, and examples of the polyolefin include olefin homopolymers such as polyethylene, polypropylene, poly-1-butene and the like; olefin copolymers such as propylene•ethylene random copolymers and the like; and the like. Among these, polypropylene, and propylene•ethylene random copolymers are preferred, and syndiotactic polypropylene is most preferred.

The elastic modulus can be determined by press molding the thermoplastic resin, and then performing a tensile test by the method described below in the Examples. For the test, 1 mm-thick sheet is formed under the molding conditions of preheating at an appropriate temperature between 200 and 300° C., which is above any higher temperature between the melting point and the glass transition temperature as measured by DSC, then molding under pressure (100 kg/cm$^2$) for 3 minutes, and then cooling under pressure (100 kg/cm$^2$) at 20° C. For example, in the case of polypropylene or propylene copolymer (including propylene•ethylene copolymers and the like) described above, molding is carried out by preheating at 200° C., then pressurizing for 3 minutes, and cooling for 5 minutes.

The thermoplastic resins as described above may be used individually or in combination of two or more kinds. Furthermore, thermoplastic resins other than those may be also used together with the above-mentioned thermoplastic resins.

Thermoplastic Resin Composition

Next, the thermoplastic resin composition according to the present invention will be explained.

The thermoplastic resin composition according to the present invention comprises 1 to 99 parts by weight, preferably 5 to 90 parts by weight, and more preferably 10 to 80 parts by weight, of the α-olefin-based copolymer (I); and 99 to 1 parts by weight, preferably 95 to 10 parts by weight, and more preferably 90 to 10 parts by weight, of the thermoplastic resin (II), or comprises 1 to 99 parts by weight, preferably 5 to 90 parts by weight, and more preferably 10 to 80 parts by weight of the α-olefin-based copolymer (I'); and 99 to 1 parts by weight, preferably 95 to 10 parts by weight, and more preferably 90 to 10 parts by weight, of the thermoplastic resin (II).

The thermoplastic resin composition of the present invention may comprise additive materials, if necessary, blended with the α-olefin-based copolymer, within the scope of not impairing the purpose of the invention. Small amounts of other synthetic resins may be also blended in, provided that the blending does not cause deviation from the purport of the invention.

The thermoplastic resin composition of the present invention can be prepared by employing any known method, and for example, can be obtained by melt kneading an α-olefin-based copolymer (I) or an α-olefin-based copolymer (I'), a thermoplastic resin (II), and other components that are added as desired, using an extruder, a kneader or the like.

The tensile modulus of the thermoplastic resin composition according to the present invention is preferably 5 MPa or greater, and more preferably 10 MPa or greater. The thermal resistance (TMA) is preferably 90° C. or higher, more preferably 100° C. or higher, and even more preferably 120° C. or higher. The gloss change rate, ΔGloss, is preferably 60% or less, and more preferably 50% or less. The permanent set is preferably 30% or less, more preferably 30% or less, and even more preferably 20% or less. The JIS A hardness is preferably 95 or less, and more preferably 93 or less. The haze is preferably 40% or less, and more preferably 30% or less.

Inter alia, it is preferable that a plurality of properties fall within the above-described ranges, and it is more preferable that the thermal resistance (TMA), permanent set and ΔGloss together fall within the above-described ranges. For example, a thermoplastic resin composition which satisfies the conditions of a TMA of 120° C. or higher, a permanent set of 20% or less, and a ΔGloss of 50% or less may be mentioned.

In this case, a press sheet having a thickness of 1 mm or 2 mm is formed in accordance with the measurement item, and is provided for the measurement.

The measurement is performed by forming a sheet having a predetermined thickness under the molding conditions of preheating at a temperature between 200 and 300° C., which is above any higher temperature between the melting point and the glass transition temperature as measured by DSC, then molding under pressure (100 kg/cm$^2$) for 3 minutes, and then cooling under pressure (100 kg/cm$^2$) at 20° C. for 5 minutes. For example, under representative conditions, a sheet having a predetermined thickness is formed by preheating at 200° C., then molding under pressure (100 kg/cm$^2$) for 3 minutes, and then cooling under pressure (100 kg/cm$^2$) at 20° C. for 5 minutes. When the thermoplastic resin composition contains, for example, polypropylene or a propylene copolymer (including propylene•ethylene random copolymer and the like), molding can be performed under such conditions, and the result can be provided to the test.

The testing methods for the respective properties are as described below in the Examples.

Molded Product Formed from Thermoplastic Resin Composition

The thermoplastic resin composition according to the present invention as described above can be widely used for the conventionally known applications of polyolefin, and particularly the polyolefin composition can be used by molding into molded products having various different shapes such as, for example, sheet, unstretched or stretched film, filament and the like.

For the molded product, those molded products obtained by any known thermoforming process such as extrusion molding, injection molding, inflation molding, blow molding, extrusion blow molding, injection blow molding, press molding, vacuum molding, calendar molding, or foam molding, may be mentioned. Hereinafter, the molded product will be described with reference to several examples.

When the molded product according to the present invention is, for example, an extrusion molded product, the shape and the product type are not particularly limited, but for example, sheet, film (unstretched), pipe, hose, wire coating, tube and the like may be mentioned, while sheet (skin material), film, tube, tube for medical use, monofilament (nonwoven fabric) and the like are particularly preferred.

When the thermoplastic composition according to the present invention is to be extrusion molded; conventionally known extrusion apparatuses and molding conditions can be employed, and for example, a product can be molded into a desired shape using a single screw extruder, a kneading extruder, a ram extruder, a gear extruder or the like, by extruding the molten thermoplastic composition through a specific die or the like.

A stretched film can be obtained by stretching an extruded sheet or extruded film (unstretched) as described above with a known stretching method such as, for example, a tentering method (longitudinal transverse stretching, transverse longitudinal stretching), a simultaneous biaxial stretching method, a uniaxial stretching method or the like.

The draw ratio employed at the time of stretching a sheet or an unstretched film is typically about 20 to 70 times in the case of biaxial stretching, and typically about 2 to 10 times in the case of uniaxial stretching. It is preferable to obtain a stretched film having a thickness of about 5 to 200 μm by stretching.

An inflation film can be also produced as a film-shaped molded product. Drawdown is unlikely to occur during the process of inflation molding.

The sheet and film molded product obtained from the thermoplastic composition of the present invention as described above, are hardly charged with electricity, are excellent in rigidity such as tensile modulus and the like, thermal resistance, impact resistance, aging resistance, transparency, see-through properties, gloss, rigidity, resistance to humidity, and gas barrier properties, and can be used widely as packaging film or the like. Since the sheet and film are particularly excellent in resistance to moisture, they can be used preferably in press through packs and the like that are used for the packing of drug tablets, capsules, and the like. The α-olefin-based copolymer (I) according to the present invention or the thermoplastic resin composition with other thermoplastic resin can be also used as an aqueous resin composition that can be used as a primer, or an additive to aqueous paint, in the case of imparting anti-chipping properties to a coat film obtained from an aqueous paint while maintaining the coat film appearance.

The filament molded product can be produced by, for example, extruding the molten thermoplastic composition through a spinneret. Specifically, a spun-bonding method or a melt blown method is suitably used. A filament thus obtained may be further stretched. This stretching may be performed so that the molecules become oriented in at least one axial direction of the filament, and it is usually desirable to perform stretching at a draw ratio of about 5 to 10 times. The filament obtained from the thermoplastic composition according to the present invention is hardly charged with electricity, and is excellent in transparency, rigidity, thermal resistance, impact resistance and stretchability.

The injection molded product can be produced by injection molding the thermoplastic composition into various shapes using conventionally known injection molding apparatuses and employing known conditions. The injection molded product obtained from the thermoplastic composition according to the present invention is hardly charged with electricity, is excellent in transparency, rigidity, thermal resistance, impact resistance, surface gloss, chemical resistance, abrasion resistance and the like, and can be used widely as a trimming material for automobile interior decoration, a material for automobile exterior decoration, housing for household electric appliances, containers, and the like.

The blow molded product can be produced by blow molding the propylene-based polymer composition using conventionally known blow molding apparatuses and employing known conditions.

For example, in extrusion blow molding, the propylene-based polymer composition is extruded from a die in a molten state at a resin temperature of 100 to 300° C. to form a tube-shaped parison. Then, after retaining the parison in a mold of a desired shape, air is blown in to make the parison fit the mold at a resin temperature of 130 to 300° C., and thereby a blow molded product can be produced. It is desirable that the draw (blow) ratio is about 1.5 to 5 times in the transverse direction.

In injection blow molding, an above-mentioned thermoplastic composition is injected into a parison-mold in a molten state where the resin temperature is 100° C. to 300° C. to form a parison. Then, after retaining the parison in a mold of the desired shape, air is blown in to make the parison fit the mold at a resin temperature of 120° C. to 300° C., and thereby a blow molded product can be produced. In obtaining the blow molded product, it is preferable that the draw (blow) ratio is 1.1 to 1.8 times in the longitudinal direction and 1.3 to 2.5 times in the transverse direction.

The blow molded product obtained from the thermoplastic composition according to the present invention has excellent transparency, flexibility, thermal resistance and impact resistance, and is also excellent in resistance to moisture.

For the press molded product, mold stamping molded products may be mentioned. For example, when a base material and a skin material are simultaneously press molded to perform composite integration molding (mold stamping molding) of the two materials, the base material can be formed from the propylene composition according to the present invention.

Specific examples of such mold stamping molded product include the materials for automobile interior decoration such as door trims, rear package trims, seat back garnishes, instrument panels, and the like. The press molded products obtained from the thermoplastic composition according to the present invention are hardly charged with electricity, and are excellent in flexibility, thermal resistance, transparency, impact resistance, aging resistance, surface gloss, chemical resistance, abrasion resistance and the like.

Second Specific Example of the Invention

As a second specific example of the thermoplastic resin composition having improved properties, in which an α-olefin-based copolymer (S) is blended with a thermoplastic resin, as provided by the present invention, the following resin composition may be mentioned.

That is to say, a polypropylene resin composition comprising 50 to 99.8% by weight of a propylene-based polymer (A), and 0.2 to 50% by weight of a propylene•α-olefin copolymer (B) (provided that propylene•ethylene binary copolymers are excluded), which comprises 90 to 40% by mole of a propylene-derived constituent unit, and 10 to 60% by mole of a constituent unit derived from an α-olefin having 2 to 20 carbon atoms except propylene, and for which, in a signal chart measured by $^{13}$C-NMR in an o-dichlorobenzene solution and predetermined such that the peak present at the highest magnetic field among the signals originating from CH (methine) of the constituent unit derived from an α-olefin having 4 to 20 carbon atoms is to be at 34.4 ppm, an absorption intensity A at about 22.0 to 20.9 ppm and an absorption intensity B at about 19.0 to 20.6 ppm satisfy the following relational expressions (i) and (ii) with respect to the absorption intensity C at about 19.0 to 22.0 ppm, which is assignable to propylene methyl:

$$(A/C) \times 100 \leq 8 \quad \text{(i), and}$$

$$(B/C) \times 100 \geq 60 \quad \text{(ii).}$$

Furthermore, a propylene resin composition comprising 50 to 99.8% by weight of a propylene-based polymer (A), and 0.2 to 50% by weight of a propylene•α-olefin copolymer (BB) (provided that propylene•ethylene binary copolymers are excluded), which is obtained by polymerizing propylene and an α-olefin having 2 to 20 carbon atoms (provided that propylene is excluded) in the presence of a catalyst containing the transition metal compound represented by the above formula (1), and which comprises 90 to 40% by mole of a propylene-derived constituent unit, and 10 to 60% by mole of a constituent unit derived from an α-olefin having 2 to 20 carbon atoms except propylene, may be mentioned.

Propylene-based Polymer (A)

The propylene-based polymer used in the present invention preferably has a tensile modulus of 400 MPa or greater, and it is more preferable at least one is selected from isotactic polypropylene and syndiotactic polypropylene. The modulus can be determined by press molding the propylene-based polymer, and then performing a tensile test by the method described below in the Examples. For the test, 1 mm-thick sheet is formed under the molding conditions of preheating at a temperature of 200° C., then molding under pressure (100 kg/cm$^2$) for 3 minutes, and then cooling under pressure (100 kg/cm$^2$) at 20° C. for 5 minutes.

First, the isotactic polypropylene will be described in the following.

An isotactic polypropylene is a polypropylene having an isotactic pentad fraction of 0.9 or more, preferably 0.95 or more, as measured by the NMR technique.

The isotactic pentad fraction (mmmm) represents the fraction for the presence of an isotactic sequence in a pentad unit in the molecular chain, which is measured by $^{13}$C-NMR, and is a fraction of the propylene monomer unit located at the center of a sequence in which five propylene monomer units are sequentially meso-bonded. Specifically, it is a value calculated as the fraction of the mmmm peak among the entire absorption peaks in the methyl carbon region observed in the $^{13}$C-NMR spectrum.

Moreover, this isotactic pentad fraction (mmmm) is measured in the following manner.

The mmmm fraction is determined from Pmmmm (the absorption intensity originating from the methyl group in the third unit at a site where five propylene units are sequentially isotactically bonded) and $P_W$ (the absorption intensity originating from the entire methyl groups in the propylene units) according to the following equation (2):

$$\text{mmmm fraction} = P_{mmmm}/P_W \tag{2}$$

The NMR measurement is performed, for example, in the following manner. That is, 0.35 g of a sample is dissolved under heating in 2.0 ml of hexachlorobutadiene. This solution is filtered through a glass filter (G2), and then introduced into an NMR tube having an internal diameter of 10 mm after adding 0.5 ml of deuterated benzene. Then, $^{13}$C-NMR measurement is performed at 120° C. using a GX-500 NMR measuring apparatus manufactured by JEOL, Ltd. The integration number is 10,000 times or more.

The isotactic polypropylene (A) may be exemplified by propylene homopolymer or a copolymer of propylene with an α-olefin having 2 to 20 carbon atoms except propylene. Here, examples of the α-olefin having 2 to 20 carbon atoms except propylene include ethylene, 1-butene, 1-pentene, 1-hexene, 4-methyl-1-pentene, 1-octene, 1-decene, 1-dodecene, 1-tetradecene, 1-hexadecene, 1-octadecene, 1-eicosene and the like, and ethylene or an α-olefin having 4 to 10 carbon atoms is preferred.

Such α-olefin may form a random copolymer with propylene, or may form a block copolymer. The constituent unit derived from this α-olefin may be contained in a proportion of 40% by mole, preferably 20% by mole, in the polypropylene.

It is desirable that the isotactic polypropylene (A) has a melt flow rate (MFR) in the range of 0.01 to 1000 g/10 min, preferably 0.05 to 500 g/10 min, as measured at 230° C. under a load of 2.16 kg according to ASTM D 1238.

Such isotactic polypropylene (A) can be produced by, for example, conducting polymerization using a Zigler catalyst system comprising (a) a solid catalyst component containing magnesium, titanium, halogen and an electron donor as the essential components, (b) an organoaluminum compound, and (c) an electron donor. Further, the same can be also obtained using a metallocene catalyst.

Next, the syndiotactic polypropylene will be described in the following.

The syndiotactic polypropylene may comprise a small amount, for example, 10% by mole or less, preferably 5% by mole or less, of ethylene, an α-olefin having 4 or more carbon atoms, or the like being copolymerized therein. For the preparation of such syndiotactic polypropylene, the catalyst may be exemplified by the metallocene catalysts described in JP-A-10-300084.

Here, the syndiotactic pentad fraction (rrrr, pentad syndiotacticity) is 0.5 or greater, preferably 0.6 or greater, more preferably 0.7 or greater, and particularly preferably 0.80 or greater. A polypropylene with a syndiotactic pentad fraction of 0.5 or greater has excellent thermal resistance and moldability, and has good and favorable characteristics as a crystalline polypropylene.

In addition, this syndiotactic pentad fraction (rrrr) is measured in the following manner. The rrrr fraction is determined from Prrrr (the absorption intensity originating from the methyl group in the third unit at a site wherein five propylene units are sequentially syndiotactically bonded) and Pw (the absorption intensity originating from the entire methyl groups in the propylene units) in the $^{13}$C-NMR spectrum according to the following equation (3):

$$\text{rrrr fraction} = P_{rrrr}/P_w \tag{3}$$

The NMR measurement is performed, for example, as follows. That is, 0.35 g of a sample is dissolved under heating in 2.0 ml of hexachlorobutadiene. This solution is filtered through a glass filter (G2), and then is introduced into an NMR tube having an internal diameter of 10 mm after adding 0.5 ml of deuterated benzene. Then, $^{13}$C-NMR measurement is performed at 120° C. using a GX-500 NMR measuring apparatus manufactured JEOL, Ltd. The integration number is 10,000 times or more.

Furthermore, it is desirable that the melt flow rate (MFR, 190° C., under a load of 2.16 kg) of the syndiotactic polypropylene is 0.001 to 1000 g/10 min, and preferably 0.01 to 500 g/10 min. With the MFR in this range, the syndiotactic polypropylene exhibits good fluidity, and thus, it is easy to blend this syndiotactic polypropylene with other components. It is also likely to obtain a molded article having excellent mechanical strength from the resultant composition.

Propylene•α-Olefin Copolymer (B)

The propylene•α-olefin-based copolymer (B) according to the present invention is such that the intensities of the signals as measured by $^{13}$C-NMR satisfy the following relationship. That is, in a signal chart measured by $^{13}$C-NMR in an o-dichlorobenzene solution and predetermined such that the peak present at the highest magnetic field among the signals originating from CH (methine) of the constituent unit derived from an α-olefin having 4 to 20 carbon atoms is to be at 34.4 ppm, an absorption intensity A at about 22.0 to 20.9 ppm and an absorption intensity B at about 19.0 to 20.6 ppm satisfy the following relational expressions (i) and (ii), preferably the relational expressions (i)' and (ii)', and more preferably the relational expressions (i)" and (ii)", with respect to the absorption intensity C at about 19.0 to 22.0 ppm, which is assignable to propylene methyl:

$$(A/C) \times 100 \leq 8 \tag{i}$$

$$(B/C) \times 100 \geq 60 \tag{ii}$$

$$(A/C) \times 100 \leq 7 \tag{i'}$$

$$(B/C) \times 100 \geq 64 \tag{ii'}$$

$$(A/C) \times 100 \leq 6 \tag{i''}$$

$$(B/C) \times 100 \geq 68 \tag{ii''}$$

In addition, this structure is measured as follows. That is, 50 mg of a sample is dissolved in about 0.5 ml of a solvent mixture of o-dichlorobenzene/deuterated benzene=5/1, and this solution is subjected to $^{13}$C-NMR measurement at 120° C. using an EX-400 NMR measuring apparatus manufactured by JEOL, Ltd. in the single proton pulse decoupling measurement mode, at a pulse width of 4.7 μs, a pulse interval of 5.5 s, and within an observation range of 180 ppm, while predetermining the peak present at the highest magnetic field among the signals originating from CH (methine) of the constituent unit derived from an α-olefin having 4 to 20 carbon atoms to be at 34.4 ppm, as the chemical shift standard. The number of integration is 10,000 times or more. Moreover, in the case of a copolymer containing a 1-butene-derived constituent unit, the peak present at the highest magnetic field among the signals originating from CH (methine) of the 1-butene-derived constituent unit is to be at 34.4 ppm.

If the propylene•α-olefin-based copolymer (B) is within such range, the copolymer tends to be excellent in syndiotacticity and to have excellent transparency, rigidity and abrasion resistance.

In addition, it is preferable for the propylene•α-olefin-based copolymer (B) to contain at least an α-olefin having 4 to 20 carbon atoms as the α-olefin, and it is more preferable to use butene as the α-olefin having 4 to 20 carbon atoms.

The propylene•α-olefin-based copolymer (B) according to the present invention comprises a propylene-derived constituent unit in an amount of 90 to 40% by mole, preferably 85 to 45% by mole, and more preferably 80 to 50% by mole, and a constituent unit derived from an α-olefin having 2 to 20 carbon atoms except propylene in an amount of 10 to 60% by mole, preferably 15 to 55% by mole, and more preferably 20 to 50% by mole (provided that propylene•ethylene binary copolymers are excluded).

If the propylene•α-olefin-based copolymer (B) is within such range, the copolymer tends to have excellent whitening resistance, abrasion resistance and heat sealability.

The α-olefin used for the preparation of such propylene•α-olefin-based copolymer (B) is not particularly limited so long as the carbon number except propylene is in the range of 2 to 20, preferably 2 to 12, and may be straight-chained, branched or cyclic in structure.

Specific examples of the α-olefin include ethylene, 1-butene, 2-butene, 1-pentene, 1-hexene, 1-heptene, 1-octene, 1-nonene, 1-decene, 1-undecene, 1-dodecene, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene; cycloolefins such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene; norbornenes such as 2-norbornene, 5-methyl-2-norbornene, 5-ethyl-2-norbornene, 5-isopropyl-2-norbornene, 5-n-butyl-2-norbornene, 5-isobutyl-2-norbornene, 5,6-dimethyl-2-norbornene, 5-chloro-2-norbornene and 5-fluoro-2-norbornene; and the like. 1-Butene, 1-hexene, 1-octene, 1-decene and 4-methyl-1-pentene are preferred, and 1-butene, 1-hexene, 1-octene and 1-decene are more preferred, with 1-butene being particularly preferred. These α-olefins may be used individually or in combination of two or more kinds. For example, ethylene (p) and an α-olefin (q) which is different from the above, and selected from the α-olefins having 4 to 20 carbon atoms, can be used at an amount ratio of (p)/(q)=2/98 to 50/50% by mole [(p)+(q)=100% by mole].

In this propylene•α-olefin-based copolymer (B), a small amount of a constituent unit derived from an aromatic vinyl compound such as styrene or the like, a constituent unit derived from the unsaturated compound (polyene) having two or more double bonds, a constituent unit formed from an alcohol, a carboxylic acid, an amine, or a derivative thereof, or the like may be contained in addition to the α-olefin-derived constituent units. An embodiment of not containing any constituent unit other than the propylene-derived constituent unit and the α-olefin-derived constituent unit is also a preferred embodiment.

The propylene•α-olefin-based copolymer (B) desirably has an intrinsic viscosity [η] in the range of usually 0.01 to 10 dl/g, preferably 0.05 to 10 dl/g, and more preferably 0.1 to 5 dl/g, as measured at 135° C. in decalin. If the intrinsic viscosity [η] of this α-olefin-based copolymer (B) is within this range, an α-olefin-based copolymer having excellent properties such as weather resistance, ozone resistance, resistance to thermal aging, low-temperature properties, resistance to dynamic fatigue and the like is obtained.

It is desirable that this propylene•α-olefin-based copolymer (B) has a single glass transition temperature, and that the glass transition temperature Tg measured by differential scanning calorimetry (DSC) is usually −0° C. or lower, preferably −3° C. or lower, and particularly preferably −5° C. or lower. When the glass transition temperature Tg of the propylene•α-olefin-based copolymer (B) is within the above-mentioned range, the copolymer has excellent cold resistance and low-temperature properties.

It is preferable that the molecular weight distribution (Mw/Mn, in terms of polystyrene, Mw: weight average molecular weight, Mn: number average molecular weight) measured by GPC is 4.0 or less. Within this range, transparency, scratch resistance and impact resistance become good, and it is preferable.

Furthermore, it is preferable that a melting peak measured by differential scanning calorimetry (DSC) does not exist. In this case, flexibility, abrasion resistance, transparency and whitening resistance are excellent.

Such propylene•α-olefin-based copolymer (B) can be obtained by copolymerizing propylene and an α-olefin in the presence of a metallocene catalyst described in the following.

For such metallocene catalyst, at least one catalyst system comprising:

(a) a transition metal compound represented by the following formula (1), and (b) at least one compound selected from (b-1) a compound reacting the transition metal M in the transition metal compound (a) and forming an ionic complex, (b-2) an organoaluminum oxy-compound and (b-3) an organoaluminum compound may be mentioned:

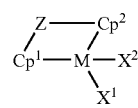

(1)

wherein M is Ti, Zr, Hf, Rn, Nd, Sm or Ru; $Cp^1$ and $Cp^2$, which are each a cyclopentadienyl group, an indenyl group, a fluorenyl group or a derivative group thereof, and are π-bonded to M; $X^1$ and $X^2$ are each an anionic ligand or a neutral Lewis base ligand; and Z is a C, O, B, S, Ge, Si or Sn atom, or a group containing these atoms.

Among the transition metal compounds represented by the above formula (1), a transition metal compound in which $Cp^1$ and $Cp^2$ are different groups may be mentioned, and more preferably, a transition metal compound in which either group of $Cp^1$ and $Cp^2$ is a cyclopentadienyl group or a derivative group thereof, and the other group is a fluorenyl group or a derivative group thereof, may be mentioned. Among these, such a compound in which either group of $Cp^1$ and $Cp^2$ is a cyclopentadienyl group or a derivative group thereof, and the other group is a fluorenyl group or a derivative group, is preferred.

According to the present invention, for the catalyst for the preparation of the propylene•α-olefin-based copolymer (B), a metallocene catalyst as described above is favorably used, but optionally, a titanium-based catalyst comprising a conventionally known solid titanium catalyst component and an organoaluminum compound, or a vanadium-based catalyst comprising a soluble vanadium compound and an organoaluminum compound can be also used.

Specific conditions for preparation will not be repeatedly described in order to avoid redundancy, but the propylene•α-olefin-based copolymer (B) can be prepared according to the method described for the preparation of the α-olefin copolymer (I).

α-Olefin-Based Polymer (BB)

The α-olefin-based polymer (BB) of the present invention is characterized in that it is obtained by polymerizing propylene and an α-olefin having 2 to 20 carbon atoms (provided that propylene is excluded) in the presence of a catalyst containing a transition metal compound represented by the following formula (1), and that it comprises a propylene-derived constituent unit in an amount of 90 to 40% by mole, and a constituent unit derived from an α-olefin having 2 to 20 carbon atoms except propylene in an amount of 10 to 60% by mole (provided that propylene•ethylene binary copolymers are excluded):

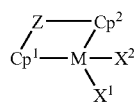

(1)

wherein M is Ti, Zr, Hf, Rn, Nd, Sm or Ru; $Cp^1$ and $Cp^2$, which are different from each other, are each a cyclopentadienyl group, an indenyl group, a fluorenyl group or a derivative group thereof, which are π-bonded to M; $X^1$ and $X^2$ are each an anionic ligand or a neutral Lewis base ligand; and Z is a C, O, B, S, Ge, Si or Sn atom, or a group containing these atoms.

The α-olefin used, amount ratio, other components, [η], Tg, Mw/Mn, the presence or absence of melting peak, the catalyst containing the transition metal compound (I) and the like will not be described in order to avoid redundancy, but they are the same as those for the α-olefin-based copolymer (B)

Ethylene•α-Olefin Random Copolymer (C)

The ethylene•α-olefin random copolymer (C) according to the present invention is preferably a random copolymer of ethylene with an α-olefin having 3 to 20, preferably 3 to 10 carbon atoms. Such α-olefin may be specifically exemplified by propylene, 1-butene, 1-pentene, 1-hexene, 4-methyl-1-pentene, 1-octene, 1-decene, 1-dodecene or the like. These can be used individually or in combination of two or more kinds. Among these, propylene, 1-butene, 1-hexene and 1-octene are preferred.

Furthermore, at the time of preparing this ethylene•-α-olefin random copolymer (C), if necessary, a small amount of another comonomer such as, for example, a diene such as 1,6-hexadiene, 1,8-octadiene or the like, or a cyclic olefin such as cyclopentene or the like, can be used.

The content of the ethylene-derived constituent unit (hereinafter, referred to as the ethylene content) in the ethylene•α-olefin random copolymer (C) (including ethylene•α-olefinpolyene copolymers) is usually 85 to 99.9% by mole, and preferably 90 to 99.5% by mole. The composition of the ethylene•α-olefin random copolymer (C) is determined by measuring a $^{13}$C-NMR spectrum of a sample usually provided by uniformly dissolving about 200 mg of an ethylene•α-olefin copolymer in 1 ml of hexachlorobutadiene in a sample tube of 10 mmφ, under the conditions of a measurement frequency of 25.05 MHz, a spectrum width of 1500 Hz, a pulse repetition time of 4.2 sec, and a pulse width of 6 μsec.

The ethylene•α-olefin random copolymer (C) has a density of 0.850 to 0.960 g/cm$^3$, preferably 0.850 to 0.930 g/cm$^3$, and more preferably 0.850 to 0.900 g/cm$^3$. Further, the density is measured using a density gradient tube according to ASTM D-1505. Also, the ethylene•α-olefin random copolymer (C) has a melt flow rate which is measured at 190° C. under a load of 2.16 kg according to ASTM D-1238 (hereinafter, abbreviated as MFR (190° C.)) in the range of 0.1 to 70 g/10 min, and preferably 1 to 40 g/10 min. The molecular structure of the ethylene•α-olefin random copolymer (C) may be linear, or may be branched with long or short side chains.

The method for preparing the ethylene•α-olefin random copolymer (C) is not particularly limited, but the copolymer can be prepared by homopolymerizing ethylene, or copolymerizing ethylene with an α-olefin, using a radical polymerization catalyst, a Phillips catalyst, a Zigler-Natta catalyst or a metallocene catalyst.

Inorganic Filler (D)

The inorganic filler (D) according to the present invention may be exemplified by silicates such as finely powdered talc, kaolinite, calcined clay, pyrophyllite, sericite, wollastonite and the like; carbonates such as precipitated calcium carbonate, heavy calcium carbonate, magnesium carbonate and the like; hydroxides such as aluminum hydroxide, magnesium hydroxide and the like; oxides such as titanium oxide, zinc oxide, zinc flower, magnesium oxide, aluminum oxide and the like; sulfates such as calcium sulfate, barium sulfate, magnesium sulfate and the like; silicic acid or silicates such as hydrated calcium silicate, hydrated aluminum silicate, hydrated silicic acid, silicic anhydride and the like; powdery fillers such as finely powdered silica, carbon black and the like; flake fillers such as mica, glass flakes and the like; fibrous fillers such as basic magnesium sulfate whiskers, calcium titanate whiskers, aluminum borate whiskers, sepiolite, PMF (processed mineral fibers), xonotlite, potassium titanate, ellestadite, glass fiber, carbon fiber and the like; balloon fillers such as glass balloon, fly ash balloon and the like; and the like.

Additives

The polypropylene resin composition according to the present invention may also contain additives such as weather resistance stabilizer, thermal resistance stabilizer, antistatic agent, anti-slipping agent, anti-blocking agent, foaming agent, anti-fogging agent, lubricant, pigment, dye, plasticizer, anti-aging agent, hydrochloric acid absorbent, antioxidant and the like, within the scope of not impairing the purpose of the invention. A small amount of an acrylic resin for emulsification or the like may be also added.

Polypropylene Resin Composition

The polypropylene resin composition according to the present invention comprises 50 to 99.8% by weight of the propylene-based polymer (A) and 0.2 to 50% by weight of the propylene•α-olefin copolymer (B) (wherein the total amount of (A) and (B) is 100% by weight). Even more preferably, the resin composition contains 55 to 90% by weight of the propylene-based polymer (A) and 10 to 45% by weight of the propylene•α-olefin copolymer (B), and particularly preferably 60 to 85% by weight of the propylene-based polymer (A) and 15 to 40% by weight of the propylene•α-olefin copolymer (B) (wherein the total amount of (A) and (B) is 100% by weight).

Alternatively, the resin composition comprises 50 to 99.8% by weight of the propylene-based polymer (A) and 0.2 to 50% by weight of the propylene•α-olefin copolymer (BB) (wherein the total amount of (A) and (BB) is 100% by weight). Even more preferably, the resin composition comprises 55 to 90% by weight of the propylene-based polymer (A) and 10 to 45% by weight of the propylene•α-olefin copolymer (BB), and particularly preferably 60 to 85% by weight of the propylene-based polymer (A) and 15 to 40% by weight of the propylene•α-olefin copolymer (BB) (wherein the total amount of (A) and (BB) is 100% by weight).

The polypropylene resin composition according to the present invention comprises the propylene-based polymer (A) and the propylene•α-olefin copolymer (B) or the propylene•α-olefin copolymer (BB), and if necessary, comprises at least one component of the ethylene•α-olefin random copolymer (C), the inorganic filler (D) and the additives.

When the polypropylene resin composition according to the present invention contains the component (C) and/or the component (D), the propylene-based polymer (A) is contained in an amount of 30 to 99.8% by weight, preferably 30 to 95% by weight, and more preferably 40 to 80% by weight, based on the whole composition ((A)+(B), when the composition contains (C) and/or (D), these are also included).

The propylene•α-olefin copolymer (B) is contained in an amount of 0.2 to 70% by weight, preferably 1 to 60% by weight, and more preferably 5 to 50% by weight, based on the whole composition.

When the propylene•α-olefin copolymer (BB) is used, and when the component (C) and/or component (D) are contained, the propylene-based polymer (A) is contained in an amount of 30 to 99.8% by weight, preferably 30 to 95% by weight, and more preferably 40 to 80% by weight, based on the whole composition ((A)+(BB), when the composition contains (C) and/or (D), these are also included). The propylene•α-olefin copolymer (BB) is contained in an amount of 0.2 to 70% by weight, preferably 1 to 60% by weight, and more preferably 5 to 50% by weight, based on the whole composition.

When the ratio of the propylene-based polymer (A) and the propylene•α-olefin copolymer (B), or the ratio of the propylene-based polymer (A) and the propylene•α-olefin copolymer (BB) is within the above-mentioned range, the resultant polypropylene resin composition tends to be excellently balanced in rigidity, impact resistance, whitening resistance and abrasion resistance.

The ethylene•α-olefin random copolymer (C) that is used if necessary, may be contained in an amount of usually 1 to 40% by weight, and preferably 5 to 35% by weight, based on the whole composition. When the ethylene•α-olefin random copolymer (C) is contained in the amount as described above, a composition which can prepare a molded product having excellent surface hardness, impact resistance and particularly low-temperature impact strength can be obtained.

The inorganic filler (D) that is used if necessary, may be contained in an amount of usually 1 to 30% by weight, and preferably 5 to 20% by weight, based on the whole composition. When the inorganic filler (D) is contained in the amount as described above, a compound which can prepare a molded product having excellent rigidity, surface hardness and impact resistance is obtained.

The polypropylene resin composition of the present invention can be prepared using any known method, and for example, can be obtained by mixing a propylene-based polymer (A), a propylene•α-olefin copolymer (B) or a propylene•α-olefin copolymer (BB), and optionally an ethylene•α-olefin random copolymer (C), an inorganic filler (D) and additives that are further added as desired, with a mixer such as a Henschel mixer, a V-blender, a ribbon blender or the like, and then melt kneading the mixture with an extruder, a kneader or the like.

The tensile modulus of the polypropylene resin composition of the present invention is 400 MPa or greater, and preferably 500 MPa to 2500 MPa. The abrasion resistance (ΔGloss (%)) of the polypropylene resin composition of the present invention is 30% or less, and preferably 1 to 25%.

The modulus and abrasion resistance can be determined by press molding the resin composition, and then performing a tensile test by the methods described below in the Examples. The test is carried out with a sheet having a thickness in accordance with the measurement items, which is formed under the molding conditions of preheating at a temperature of 200° C., then molding under pressure (100 kg/cm$^2$) for 3 minutes, and then cooling under pressure (100 kg/cm$^2$) at 20° C. for 5 minutes.

The Izod impact strength (0° C., J/m) of the polypropylene resin composition of the present invention is 30 J/m or greater, and preferably 35 to 1000 J/m (non-destructive). The conditions for injection molding are such as a cylinder temperature of 200° C., a mold temperature of 40° C. and a cooling time of 30 seconds, using an IS-55 EPN manufactured by Toshiba Machine Co., Ltd.

Molded Product Formed from Polypropylene Resin Composition

The polypropylene resin composition according to the present invention can be widely used in the conventionally known applications of polyolefin, and for the molded product, specifically those molded products obtained by known thermoforming processes such as extrusion molding, injection molding, inflation molding, blow molding, extrusion blow molding, injection blow molding, press molding, vacuum molding, calendar molding, foam molding and the like, may be mentioned.

The polypropylene resin composition according to the present invention can be widely used in the conventionally known applications of polyolefin, and particularly the polyolefin composition can be used after molding into molded products having various different shapes such as, for example, sheet, unstretched or stretched film, filament and the like.

For specific examples of the molded product formed from the polypropylene resin composition, the specific shapes described for the molded products formed from the thermoplastic resin composition, which is the first specific examples of the invention, can be directly applied to the polypropylene resin composition. These specific examples will not be described in order to avoid repetition, but adequate and desirable molded products can be formed on the basis of the description on the molded products formed from the thermoplastic resin composition described above.

Third Specific Examples of the Invention

As a third specific example of the thermoplastic resin composition having improved properties, in which an α-olefinbased copolymer (S) is blended with a thermoplastic resin, as provided by the present invention, the following resin composition may be mentioned.

That is, a propylene-based copolymer composition comprising 30 to 80 parts by weight of a non-crosslinked or partially crosslinked olefin-based thermoplastic elastomer (X); 0 to 40 parts by weight of a propylene-based polymer (Y); and 5 to 60 parts by weight of a propylene•α-olefin copolymer (Z), which comprises 30 to 80% by mole of a propylene-derived constituent unit, 0 to 30% by mole of an ethylene-derived constituent unit, and 10 to 50% by mole of a constituent unit derived from an α-olefin having 4 to 20 carbon atoms (wherein the total amount of the propylene-derived constituent unit, the ethylene-derived constituent unit and the constituent unit derived from an α-olefin having 4 to 20 carbon atoms is 100% by mole), and for which, in a signal chart measured by $^{13}$C-NMR in an o-dichlorobenzene solution and determined such that the peak present at the highest magnetic field among the signals originating from CH (methine) of the constituent unit derived from an α-olefin having 4 to 20 carbon atoms is to be at 34.4 ppm, an absorption intensity A at about 22.0 to 20.9 ppm and an absorption intensity B at about 19.0 to 20.6 ppm satisfy the following relational expressions (i) and (ii) with respect to an absorption intensity C at about 19.0 to 22.0 ppm, which is assignable to propylene methyl:

$$(A/C) \times 100 \leq 8 \quad \text{(i), and}$$

$$(B/C) \times 100 \geq 60 \quad \text{(ii),}$$

provided that the total of (X), (Y) and (Z) is 100 parts by weight, may be mentioned.

In another embodiment of the present invention, a propylene-based copolymer composition comprising 30 to 80 parts by weight of a non-crosslinked or partially crosslinked olefin-based thermoplastic elastomer (X); 0 to 40 parts by weight of a propylene-based polymer (Y); and 5 to 60 parts by weight of a propylene•α-olefin copolymer (ZZ), which is obtained by polymerizing propylene and an α-olefin having 4 to 20 carbon atoms (provided that propylene is excluded), and ethylene if necessary, in the presence of a catalyst containing a transition metal compound represented by the following formula (1), and which comprises 30 to 80% by mole of a propylene-derived constituent unit, 0 to 30% by mole of an ethylene-derived constituent unit, and 10 to 50% by mole of a constituent unit derived from an α-olefin having 4 to 20 carbon atoms (wherein the total amount of the propylene-derived constituent unit, the ethylene-derived constituent unit, and the constituent unit derived from an α-olefin having 4 to 20 carbon atoms is 100% by mole) (provided that the total of (X), (Y) and (ZZ) is 100 parts by weight):

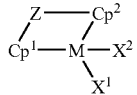

(1)

wherein M is Ti, Zr, Hf, Rn, Nd, Sm or Ru; $Cp^1$ and $Cp^2$, which are each a cyclopentadienyl group, an indenyl group, a fluorenyl group or a derivative group thereof, and are π-bonded to M; $X^1$ and $X^2$ are each an anionic ligand or a neutral Lewis base ligand; and Z is a C, O, B, S, Ge, Si or Sn atom, or a group containing these atoms.

Hereinafter, the propylene-based copolymer composition according to the present invention will be described in detail.

[Non-Crosslinked or Partially Crosslinked Olefin-based Thermoplastic Elastomer (X)]

The non-crosslinked or partially crosslinked olefin-based thermoplastic elastomer used in the present invention preferably comprises polypropylene and an ethylene•α-olefin random copolymer containing non-conjugated diene, but is not limited thereto. The elastomer may be, for example, a non-crosslinked or partially crosslinked olefin-based elastomer comprising polypropylene and an ethylene•α-olefin random copolymer, and the α-olefin is preferably propylene or butene.

It is preferable for the non-crosslinked or partially crosslinked olefin-based thermoplastic elastomer used in the present invention, to have an MFR of 0.001 to 100, and more preferably 0.01 to 80, as measured at 230° C. under a load of 10 kg.

The melting point of the non-crosslinked or partially crosslinked olefin-based thermoplastic elastomer used in the present invention, which is determined from an endotherm curve of DSC, is preferably in the range of 120 to 165° C., and more preferably 130 to 160° C. The olefin-based thermoplastic elastomer composition according to the present invention is a non-crosslinked thermoplastic elastomer composition or a partially crosslinked thermoplastic elastomer composition, and is composed of a specific crystalline polyolefin resin (X-1) and a specific α-olefin-based copolymer rubber (X-2).

Crystalline Polyolefin Resin (X-1)

The crystalline polyolefin resin (X-1) used in the present invention is formed from a crystalline high molecular weight solid product obtained by polymerizing one or more mono-olefins by means of a high pressure or a low pressure process. Such resin may be exemplified by isotactic and syndiotactic mono-olefin polymer resins, and these representative resins are commercially available.

Specific examples of the suitable raw material olefin for the crystalline polyolefin resin include ethylene, propylene, 1-butene, 1-pentene, 1-hexene, 2-methyl-1-propene, 3-methyl-1-pentene, 4-methyl-1-pentene, 5-methyl-1-hexene, 1-octene, 1-decene, and olefin mixtures formed by mixing two or more of these olefins.

In particular, an isotactic polypropylene having a propylene content of 70% by mole or more, preferably a propylene content of 80% by mole or more, is suitably used.

The polymerization mode may be of random type or block type, and any polymerization mode can be employed without limitation, as long as a resin-like product can be obtained. It is preferable for the crystalline polyolefin resin used in the present invention to have an MFR (ASTM D1238, 230° C.) in the range of usually 0.01 to 100 g/10 min, and particularly preferably 0.05 to 50 g/10 min.

It is preferable for the crystalline polyolefin (X-1) used for the thermoplastic elastomer (X) of the present invention to have a melting point determined from an endotherm curve of DSC in the range of 120 to 165° C., and more preferably 130° C. to 160° C. It is a preferred embodiment that the crystalline polyolefin (X) is a crystalline polyolefin other than those mentioned as (Y) that is to be described below.

The crystalline polyolefin resin (X-1) plays a role of improving the fluidity and thermal resistance of the composition. According to the present invention, the crystalline polyolefin resin (X-1) used in a proportion of 10 to 60 parts by weight, preferably 20 to 55 parts by weight, in 100 parts by weight of the total amount of the crystalline polyolefin resin (X-1) and the α-olefin-based copolymer rubber (X-2).

When the crystalline polyolefin resin (X-1) is used in the proportion as mentioned above, an olefin-based thermoplastic elastomer composition having excellent rubber elasticity as well as excellent moldability is obtained.

α-Olefin-based Copolymer Rubber (X-2)

The α-olefin-based copolymer rubber (X-2) used in the present invention is a rubber obtained by copolymerizing an α-olefin having 2 to 20 carbon atoms, preferably 2 to 12 carbon atoms, with a non-conjugated polyene, for example, a non-conjugated diene.

Specific examples of the α-olefin include ethylene, propylene, 1-butene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, 12-ethyl-1-tetradecene and the like.

According to the present invention, the α-olefins as described above may be used individually or may be used as a mixture of two or more kinds. When 4-methyl-1-pentene and another α-olefin are used as a mixture, the molar ratio of the other α-olefin to 4-methyl-1-pentene (other α-olefin/4-methyl-1-pentene) is preferably in the range of 10/90 to 95/5.

Among the above α-olefins, ethylene, propylene and 1-butene are particularly preferably used.

Specific examples of the non-conjugated polyene include dicyclopentadiene, 1,4-hexadiene, cyclooctadiene, methylenenorbornene, ethylidenenorbornene, 4-methyl-1,4-hexadiene, 5-methyl-1,4-hexadiene, 4-ethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, S-ethyl-1,5-decadiene, 6-ethyl-1,5-decadiene, 6-methyl-1,6-decadiene, 7-methyl-1,6-decadiene, 6-ethyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 9-methyl-1,8-undecadiene and the like. In particular, among these, 5-ethylidene-2-norbornene, 5-vinyl-2-norbornene, dicyclopentadiene, 4,8-dimethyl-1,4,8-decatriene (DMDT) and 4-ethylidene-8-methyl-1,7-nonadiene (EMND) are preferred.

According to the present invention, the non-conjugated polyenes, for example, non-conjugated dienes, as described above may be used individually, or may be used as a mixture of two or more kinds. Moreover, in addition to the non-conjugated polyenes as described above, other copolymerizable monomers may be also used within the scope of not impairing the purpose of the invention.

The content of the non-conjugated diene which constitutes the α-olefin-based copolymer rubber used in the present invention is in the range of 0.01 to 30% by mole, preferably 0.1 to 20% by mole, and particularly preferably 0.1 to 10% by mole.

The α-olefin-based copolymer rubber used in the present invention is, for example, a copolymer of ethylene, an α-olefin having 3 or more carbon atoms and a non-conjugated polyene, and such a copolymer having a ratio of ethylene to the α-olefin having 3 or more carbon atoms, that is, ethylene/α-olefin having 3 or more carbon atoms (molar ratio), of 40/60 to 95/5 may be mentioned.

The intrinsic viscosity [η] of the α-olefin-based copolymer rubber used in the present invention, as measured at 135° C. in decalin solvent, is in the range of 1.0 to 10.0 dl/g, and preferably 1.5 to 7 dl/g. The α-olefin-based copolymer rubber used in the present invention is not particularly limited, but one having no melting point (Tm) that is determined from an endotherm curve of DSC, or having a melting point of below 120° C., is preferred.

According to the present invention, the α-olefin-based copolymer rubber (X-2) is used in a proportion of 90 to 40 parts by weight, preferably 80 to 45 parts by weight, in 100 parts by weight of the total amount of the crystalline polyolefin resin (X-1) and the α-olefin-based copolymer rubber (X-2).

The α-olefin-based copolymer rubber (X-2) as described above can be produced by the following method. The α-olefin-based copolymer rubber (X-2) used in the present invention is obtained by copolymerizing an α-olefin having 2 to 20 carbon atoms and a non-conjugated diene in the presence of a catalyst for olefin polymerization.

The olefin-based thermoplastic elastomer composition according to the present invention may optionally comprise a softening agent (X-3) and/or an inorganic filler (X-4), in addition to the crystalline polyolefin resin (X-1) and the α-olefin-based copolymer rubber (X-2).

The softening agent (X-3) used in the present invention can be those softening agents conventionally used for rubber, and specific examples thereof include petroleum-based materials such as process oils, lubricant, paraffin, liquid paraffin, petroleum asphalt, vaseline and the like; coal tars such as coal tar, coal tar pitch and the like; fatty oils such as castor oil, linseed oil, rapeseed oil, soy bean oil, palm oil and the like; waxes such as tall oil, bees wax, carnauba wax, lanolin and the like; fatty acids or metal salts thereof such as ricinolic acid, palmitic acid, stearic acid, barium stearate, calcium stearate and the like; synthetic polymeric materials such as petroleum resin, coumarone-indene resin, atactic polypropylene and the like; ester plasticizers such as dioctyl phthalate, dioctyl adipate, dioctyl sebacate and the like; and further microcrystalline wax, rubber substitute (factice), liquid polybutadiene, modified liquid polybutadiene, liquid thiocol and the like.

According to the present invention, the softening agent (X-3) is used in a proportion of usually 200 parts by weight or less, preferably 2 to 100 parts by weight, relative to 100 parts by weight of the total amount of the crystalline polyolefin resin (X-1) and the α-olefin-based copolymer rubber (X-2). According to the present invention, when the amount of the softening agent (X-3) used exceeds 200 parts by weight, the resulting thermoplastic elastomer composition tends to be deteriorated in the thermal resistance and thermal aging resistance.

The inorganic filler (X-4) used in the present invention may be specifically exemplified by calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bead, shirasu balloon or the like.

According to the present invention, the inorganic filler (X-4) is used in a proportion of usually 100 parts by weight or less, preferably 2 to 50 parts by weight, relative to 100 parts by weight of the total amount of the crystalline polyolefin resin (X-1) and the α-olefin-based copolymer rubber (X-2). According to the present invention, when the amount of the inorganic filler (X-4) used exceeds 100 parts by weight, the resulting thermoplastic elastomer composition tends to be deteriorated in rubber elasticity and molding processability.

Furthermore, the partially crosslinked olefin-based thermoplastic elastomer composition according to the present invention is obtained by partially crosslinking through a dynamic thermal treatment a mixture of the crystalline polyolefin resin (X-1) and the α-olefin-based copolymer rubber (X-2) described above, and optionally a softening agent (X-3) and/or an inorganic filler (X-4), and further the ethylene·α-olefin copolymer rubber, ethylene·α-olefin-non-conjugated diene copolymer rubber and the like, in the presence of an organic peroxide as described below.

Here, the term "through a dynamic thermal treatment" refers to kneading in the molten state. Specific examples of the organic peroxide include dicumyl peroxide, di-tert-butyl peroxide, 2,5-dimethyl-2,5-di(tert-butylperoxy)hexane, 2,5-dimethyl-2,5-di(tert-butylperoxy)hexyne-3,1,3-bis(tert-butylperoxyisopropyl)benzene, 1,1-bis(tert-butylperoxy)3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butylperoxybenzoate, tert-butylperoxyisopropyl carbonate, diacetyl peroxide, lauroyl peroxide, tert-butylcumyl peroxide and the like.

Such organic peroxide is used in an amount of 0.02 to 3 parts by weight, preferably 0.05 to 1 part by weight, relative to 100 parts by weight of the entire product to be treated, that is, the total amount of the crystalline polyolefin resin (X-1) and the α-olefin-based copolymer rubber (X-2). When this amount of addition is smaller than the above-described range, the resulting thermoplastic elastomer composition has a low degree of crosslinking, and thus has insufficient thermal resistance, tensile properties, elastic recovery, impact resilience and the like. Further, when this amount of addition is larger than the range, the resulting thermoplastic elastomer composition has too high a degree of crosslinking, and thus may result in deterioration in moldability.

According to the present invention, at the time of the partial crosslinking treatment by the organic peroxide, a peroxy crosslinking aid such as sulfur, p-quinonedioxime, p,p'-dibenzoylquinonedioxime, N-methyl-N,N'-m-phenylenedimaleimide or the like, divinylbenzene, triallyl cyanurate, a polyfunctional methacrylate monomer such as ethylene glycol dimethacrylate, polyethylene glycol dimethacrylate, trimethylolpropane trimethacrylate, or the like, or a polyfunctional vinyl monomer such as vinyl butyrate, vinyl stearate or the like may be also added.

By using a compound such as the crosslinking aid as described above, a uniform and mild crosslinking reaction can be expected. Such crosslinking aid or compound like polyfunctional vinyl monomer is used in an amount of usually 2 parts by weight or less, preferably 0.3 to 1 part by weight, relative to 100 parts by weight of the total product to be treated.

In order to promote decomposition of the organic peroxide, a decomposition promoting agent, such as a tertiary amine such as triethylamine, tributylamine, 2,4,6-tri(dimethylamino)phenol or the like, naphthenate of aluminum, cobalt, vanadium, copper, calcium, zirconium, manganese, magnesium, lead, mercury or the like, or the like may be used.

The dynamic thermal treatment according to the present invention is preferably performed in a non-open type apparatus, and is preferably performed in an inert gas atmosphere such as nitrogen, carbon dioxide or the like. The temperature is in the range of from the melting point of the crystalline polyolefin resin (X-1) to 300° C., usually 150 to 250° C., and preferably 170 to 225° C. The kneading time is usually 1 to 20 minutes, and preferably 1 to 10 minutes. The applied shear force is 10 to 100,000 $sec^{-1}$, and preferably 100 to 50,000 $sec^{-1}$, as a shear rate.

For the kneading apparatus, a mixing roll, an intensive mixer (for example, Banbury mixer, kneader), a single-screw or twin-screw extruder or the like may be used, and a non-open type apparatus is preferred.

According to the present invention, through the above-described dynamic thermal treatment, a non-crosslinked or partially crosslinked olefin-based thermoplastic elastomer composition comprising a crystalline polyolefin resin (X-1) and an α-olefin-based copolymer rubber (X-2) is obtained.

In addition, according to the present invention, the phrase "the thermoplastic elastomer composition is partially crosslinked" refers to the status in which the gel content as measured by the method described below is in the range of 20% or greater, preferably 20 to 99.5%, and particularly preferably 45 to 98%. Measurement of the gel content: 100 mg of a sample of the thermoplastic elastomer composition is weighed and cut to small pieces of 0.5 mm×0.5 mm×0.5 mm. The cut pieces are immersed in 30 ml of cyclohexane in a sealed container at 23° C. for 48 hours, and then the sample is taken out on a filter paper and dried at room temperature for 72 hours or more, until the weight becomes constant.

The result of subtracting the weight of all of cyclohexane-insoluble components (fibrous filler, filler, pigment, etc.) other than the polymer components, and the weight of the crystalline polyolefin resin (X-1) in the sample before immersion in cyclohexane, from this weight of dry residue, is referred to as the "corrected final weight [Y]".

On the other hand, the α-olefin-based copolymer (X-2) in the sample is referred to as the "corrected initial weight [X]". Here, the gel content is determined from the following equation.

$$\text{Gel content [wt \%]} = (\text{corrected final weight } [Y]/\text{corrected initial weight } [X]) \times 100$$

[Propylene-Based Polymer (Y)]

For the propylene-based polymer (Y), the same polymer as the propylene-based polymer (A) described for the polypropylene resin composition can be used.

The tensile modulus of the propylene-based polymer (Y) used in the present invention is preferably 400 MPa or greater, preferably 400 MPa to 2500 MPa, and more preferably 500 MPa to 2000 MPa, and it is preferable that at least one is selected from isotactic polypropylene and syndiotactic polypropylene. Furthermore, the modulus can be determined by press molding the propylene-based polymer, and then performing a tensile test by the method described below in the Examples. For the test, 1 mm-thick sheet is formed under the molding conditions of preheating at a temperature of 200° C., then molding under pressure (100 $kg/cm^2$) for 3 minutes, and then cooling under pressure (100 $kg/cm^2$) at 20° C. for 5 minutes.

First, isotactic polypropylene will be described in the following.

An isotactic polypropylene is a polypropylene having an isotactic pentad fraction measured by NMR of 0.9 or greater, preferably 0.95 or greater.

Measurement of the isotactic pentad fraction is carried out by the method described for the matter of the propylene-based polymer (A) in the second specific example.

For the isotactic polypropylene, propylene homopolymer or a copolymer of propylene and an α-olefin having 2 to 20 carbon atoms other than propylene may be mentioned. Here, the α-olefin having 2 to 20 carbon atoms other than propylene may be exemplified by ethylene, 1-butene, 1-pentene, 1-hexene, 4-methyl-1-pentene, 1-octene, 1-decene, 1-dodecene, 1-tetradecene, 1-hexadecene, 1-octadecene, 1-eicosene or the like, and ethylene or an α-olefin having 4 to 10 carbon atoms is preferred. Such α-olefin may form a random copolymer with propylene, or may form a block copolymer. The constituent unit derived from such α-olefin may be contained in a proportion of 40% by mole or less, preferably 20% by mole or less, in the polypropylene.

It is preferable for the isotactic polypropylene to have a melt flow rate (MFR), which is measured at 230° C. under a load of 2.16 kg according to ASTM D-1238, in the range of 0.01 to 1000 g/10 min, and preferably 0.05 to 500 g/10 min.

Such isotactic polypropylene can be prepared by polymerization using, for example, a Zigler catalyst system comprising (a) a solid catalyst component containing magnesium, titanium, halogen and an electron donor as the essential components, (b) an organoaluminum compound, and (c) an electron donor. Also, the same can be obtained using a metallocene catalyst.

When the propylene-based polymer (Y) is isotactic polypropylene, it may be identical with or different from the isotactic polypropylene suitably used as the crystalline polyolefin resin (X-1). In the case of using isotactic polypropylene for both the propylene-based polymer (Y) and the crystalline polyolefin resin (X-1), the isotactic polypropylene is preferably contained in an amount of 10 to 60% by weight, preferably 15 to 50% by weight, in the resin composition of the present invention.

For the isotactic polypropylene, propylene•ethylene random copolymers and propylene•ethylene block copolymers, which are excellently balanced in the whitening resistance and impact resistance, are preferred among the polypropylene copolymers produced with use of Ziegler catalyst.

Next, syndiotactic polypropylene will be described in the following.

The syndiotactic polypropylene may have a small amount, for example, 10% by mole or less, preferably 5% by mole or less, of ethylene, an α-olefin having 4 or more carbon atoms and the like copolymerized therein.

During the preparation of such syndiotactic polypropylene, the metallocene catalysts described in JP-A-10-300084 may be used as a catalyst.

Here, the syndiotactic pentad fraction (rrrr, pentad syndiotacticity) is 0.5 or greater, preferably 0.6 or greater, more preferably 0.7 or greater, and particularly preferably 0.80 or greater, and a polypropylene having a syndiotactic pentad fraction of 0.5 or greater has excellent thermal resistance and moldability. Thus, the polypropylene has good properties as crystalline polypropylene and is preferred.

Measurement of the syndiotactic pentad fraction is performed by the method described for the matter of the propylene-based polymer (A) in the second specific example.

Furthermore, the melt flow rate (MFR, 190° C., under a load of 2.16 kg) of the syndiotactic polypropylene is 0.001 to 1000 g/10 min, and preferably 0.01 to 500 g/10 min. With the MFR within this range, the syndiotactic polypropylene exhibits good fluidity, and is easily blended with other components. Also, the resulting composition tends to give molded articles with excellent mechanical strength.

Such propylene-based polymer (Y) is contained in the resin composition in an amount of 0 to 40 parts by weight, preferably 0 to 35 parts by weight, and more preferably 5 to 35 parts by weight. When the syndiotactic polypropylene (Y) is present within this range, the α-olefin-based copolymer composition is excellently balanced in thermal resistance, rubber elasticity and abrasion resistance.

Propylene•α-olefin Copolymer (Z)

The propylene•α-olefin copolymer (Z) used in the present invention comprises 30 to 80% by mole of a propylene-derived constituent unit and 0 to 20% by mole of an ethylene-derived constituent unit, and preferably comprises 20 to 50% by mole of a constituent unit derived from an α-olefin having 4 to 20 carbon atoms. The α-olefin is preferably selected from butene and octene. Among them, butene is particularly preferred. Also, according to the present invention, two or more kinds of the α-olefin having 4 to 20 carbon atoms may be used, and in that case, it is desirable that two or more α-olefins are contained in an amount of 30 to 60% by mole in total.

The propylene•α-olefin copolymer (Z) used in the present invention contains 30 to 80% by mole, preferably 40 to 80% by mole, and more preferably 45 to 70% by mole, of a propylene-derived repeating unit; 0 to 20% by mole, preferably 0 to 18% by mole, and more preferably 3 to 15% by mole, of an ethylene-derived repeating unit; and 10 to 50% by mole, preferably 15 to 50% by mole, and more preferably 20 to 45% by mole, of a repeating unit derived from an α-olefin.

In this α-olefin-based copolymer (Z), a constituent unit derived from an aromatic vinyl compound such as styrene or the like, a constituent unit derived from the polyene-based unsaturated compound (polyene) having two or more double bonds, a constituent unit derived from an alcohol, a carboxylic acid, an amine, or a derivative thereof, or the like may be contained, in addition to the α-olefin-derived constituent units. Furthermore, an embodiment in which no other constituent unit is contained in addition to ethylene, propylene and the α-olefin having 4 to 20 carbon atoms, is also a preferred embodiment.

This propylene•α-olefin copolymer (Z) has a Young's modulus of preferably 150 MPa or less, more preferably 100 MPa or less, and even more preferably 50 MPa or less.

The modulus can be determined by press molding the copolymer (Z), and then performing a tensile test by the method described below in the Examples. For the test, 1 mm-thick sheet is formed under the molding conditions of preheating at a temperature of 190° C., then molding under pressure (100 kg/cm$^2$) for 2 minutes, and then cooling under pressure (100 kg/cm$^2$) at 20° C.

Such propylene•α-olefin copolymer (Z) has an intrinsic viscosity [η], which is measured at 135° C. in decalin, in the range of usually 0.01 to 10 dl/g, preferably 0.5 to 10 dl/g, and more preferably 1 to 8 dl/g.

This propylene•α-olefin copolymer (Z) has a single glass transition temperature, and the glass transition temperature (Tg) measured by differential scanning calorimetry (DSC) is preferably 0° C. or lower, more preferably −3° C. or lower, and even more preferably −5° C. or lower. When the glass transition temperature (Tg) of the propylene•α-olefin copolymer (Z) is within the above-described range, the copolymer has excellent cold resistance and low-temperature properties. Further, the molecular weight distribution (Mw/Mn, in terms of polystyrene, Mw: weight average molecular weight, Mn: number average molecular weight) determined by gel permeation chromatography (GPC) is preferably 4.0 or less, and particularly preferably 3.5 or less.

Here, with regard to the propylene•α-olefin copolymer (Z), particularly a propylene•ethylene•butene copolymer, the signal intensities obtained from measurement by $^{13}$C-NMR satisfy the following relationships. That is, it is preferable that, in a signal chart measured by $^{13}$C-NMR in an o-dichlorobenzene solution and predetermined such that the peak present at the highest magnetic field among the signals originating from CH (methine) of the constituent unit derived from an α-olefin having 4 to 20 carbon atoms is to be at 34.4 ppm, an absorption intensity A at about 22.0 to 20.9 ppm and an absorption intensity B at about 19.0 to 20.6 ppm satisfy the following relational expressions (i) and (ii), preferably the relational expressions (i)' and (ii)', and more preferably the relational expressions (i)" and (ii)", with respect to an absorption intensity C at about 19.0 to 22.0 ppm, which is assignable to propylene methyl:

$(A/C) \times 100 \leq 8$      (i), $(B/C) \times 100 \geq 60$      (ii), $(A/C) \times 100 \leq 7$      (i)', $(B/C) \times 100 \geq 64$      (ii)', $(A/C) \times 100 \leq 6$      (i)", $(B/C) \times 100 \geq 68$      (ii)"

Within this range, the copolymer has good transparency, scratch resistance and impact resistance, and thus is preferable.

In addition, this structure is measured in the following manner. That is, 50 mg of a sample is dissolved in about 0.5 ml of a solvent mixture of o-dichlorobenzene/deuterated benzene=5/1, and this solution is subjected to $^{13}$C-NMR measurement at 120° C. using an EX-400 NMR measuring apparatus manufactured by JEOL, Ltd. in the single proton pulse decoupling measurement mode, at a pulse width of 4.7 μs, a pulse interval of 5.5 s, and within an observation range of 180 ppm, while predetermining the peak present at the highest magnetic field among the signals originating from CH (methine) of the constituent unit derived from an α-olefin having 4 to 20 carbon atoms to be at 34.4 ppm, as the chemical shift standard. The number of integration is 10,000 times or more. Within this range, transparency, scratch resistance and impact resistance become good, and thus, it is preferable. Moreover, in the case of a copolymer containing a 1-butene-derived constituent unit, the peak present at the highest magnetic field among the signals originating from CH (methine) of the 1-butene-derived constituent unit is to be at 34.4 ppm.

For the propylene•α-olefin copolymer (Z), the α-olefin having 4 to 20 carbon atoms is preferably 1-butene.

Such propylene•α-olefin copolymer (Z) is obtained by copolymerizing propylene, ethylene and an α-olefin in the presence of a metallocene catalyst described below, such that 30 to 80% by mole of a propylene-derived repeating unit, 0 to 20% by mole of an ethylene-derived repeating unit, and 10 to 50% by mole of a repeating unit derived from the α-olefin are contained.

For such metallocene catalyst, at least one catalyst system comprising:

(a) a transition metal compound represented by the following formula (1), and (b) at least one compound selected from (b-1) a compound reacting with the transition metal M in the transition metal compound (a) and forming an ionic complex, (b-2) an organoaluminum oxy-compound and (b-3) an organoaluminum compound, may be mentioned.

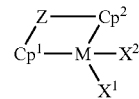

(1)

wherein M is Ti, Zr, Hf, Rn, Nd, Sm or Ru; $Cp^1$ and $Cp^2$, which are each a cyclopentadienyl group, an indenyl group, a fluorenyl group or a derivative group thereof, and are π-bonded to M; $X^1$ and $X^2$ are each an anionic ligand or a neutral Lewis base ligand; and Z is a C, O, B, S, Ge, Si or Sn atom, or a group containing these atoms.

Among the transition metal compounds represented by the formula (1), a transition metal compound in which $Cp^1$ and $Cp^2$ are different groups may be mentioned, and more preferably, a transition metal compound in which either group of $Cp^1$ and $Cp^2$ is a cyclopentadienyl group or a derivative group thereof, and the other group is a fluorenyl group or a derivative group thereof, may be mentioned. Among these, such a compound in which either group of $Cp^1$ and $Cp^2$ is a cyclopentadienyl group or a derivative group thereof, and the other group is a fluorenyl group or a derivative group, is preferred.

According to the present invention, for the catalyst for the preparation of the propylene•α-olefin copolymer (Z), a metallocene catalyst as described above is favorably used, but optionally, a titanium-based catalyst comprising a conventionally known solid titanium catalyst component and an organoaluminum compound, or a vanadium-based catalyst comprising a soluble vanadium compound and an organoaluminum compound can be also used.

Specific preparation conditions thereof will not be repeatedly described in order to avoid redundancy, but the propylene•α-olefin copolymer (Z) can be prepared according to the method described for the preparation of the α-olefin copolymer (I).

Propylene•α-olefin-based Polymer (ZZ)

The propylene•α-olefin-based polymer (ZZ) of the present invention is characterized in that it is obtained by polymerizing propylene and an α-olefin having 4 to 20 carbon atoms, and ethylene if necessary, in the presence of a catalyst containing a transition metal compound represented by the following formula (1), and comprises 30 to 80% by mole of a propylene-derived constituent unit, 0 to 30% by mole of an ethylene-derived constituent unit, and 10 to 50% by mole of a constituent unit derived from an α-olefin having 4 to 20 carbon atoms (wherein the total amount of the propylene-derived constituent unit, the ethylene-derived constituent unit, and the constituent unit derived from the α-olefin having 4 to 20 carbon atoms is 100% by mole) (provided that propylene•ethylene binary copolymers are excluded):

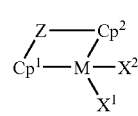

(1)

wherein M is Ti, Zr, Hf, Rn, Nd, Sm or Ru; $Cp^1$ and $Cp^2$, which are different from each other, are each a cyclopentadienyl group, an indenyl group, a fluorenyl group or a derivative group thereof, which are π-bonded to M; $X^1$ and $X^2$ are each an anionic ligand or a neutral Lewis base ligand; and Z is a C, O, B, S, Ge, Si or Sn atom, or a group containing these atoms.

The α-olefin used, amount ratio, Young's modulus, [η], Tg, Mw/Mn, the catalyst containing a transition metal compound (I) and the like will not be described in order to avoid redundancy, but are the same as those described for the α-olefin-based copolymer (Z).

Propylene-based Polymer Composition

The propylene-based copolymer composition of the present invention comprises 30 to 80 parts by weight, preferably 40 to 70 parts by weight, of the non-crosslinked or partially crosslinked olefin-based thermoplastic elastomer (X); 0 to 40 parts by weight, preferably 0 to 35 parts by weight, of the polypropylene (Y); and 5 to 60 parts by weight, preferably 5 to 50 parts by weight, of the propylene•α-olefin copolymer (Z), which comprises 30 to 80% by mole of a propylene-derived constituent unit and 0 to 20% by mole of an ethylene-derived constituent unit, and 10 to 50% by mole of a constituent unit derived from an α-olefin having 4 to 20 carbon atoms. Here, the total of (X), (Y) and (Z) is 100 parts by weight. It is preferable that the ratio of (Y) to (Z) according to the present invention is in particular 0/100 to 90/10, more preferably 0/100 to 70/30, and even more preferably 10/90 to 40/60, as a weight ratio of (Y)/(Z).

In another embodiment of the present invention, the propylene-based copolymer composition comprises 30 to 80 parts by weight, preferably 40 to 70 parts by weight, of the non-crosslinked or partially crosslinked olefin-based thermoplastic elastomer (X); 0 to 40 parts by weight, preferably 0 to 35 parts by weight, of the polypropylene (Y); and 5 to 60 parts by weight, preferably 5 to 50 parts by weight, of the propylene•α-olefin copolymer (ZZ), which comprises 30 to 80% by mole of a propylene-derived constituent unit and 0 to 20% by mole of an ethylene-derived constituent unit, and 10 to 50% by mole of a constituent unit derived from an 0-olefin having 4 to 20 carbon atoms. Here, the total of (X), (Y) and (ZZ) is 100 parts by weight. It is preferable that the ratio of (Y) to (ZZ) according to the present invention is in particular 0/100 to 90/10, more preferably 0/100 to 70/30, and even more preferably 10/90 to 40/60, as a weight ratio of (Y)/(ZZ).

The propylene-based copolymer composition of the present invention may contain, if necessary, additives such as softening agent, tackifying agent, weather resistance stabilizer, thermal resistance stabilizer, antistatic agent, anti-slipping agent, anti-blocking agent, anti-fogging agent, lubricant, pigment, dye, plasticizer, crosslinking agent, crosslinking aid, anti-aging agent, hydrochloric acid absorbent, antioxidant and the like; modifying agents such as maleic anhydride, acrylic acid, silane coupling agent and the like; crosslinking agents such as organic peroxides and the like; crosslinking aids such as divinylbenzene and the like; and the like, within the scope of not impairing the purpose of the invention. Also, a small amount of other copolymers can be also blended in, provided that the blending does not cause deviation from the purport of the invention.

The propylene-based polymer composition according to the present invention can be prepared using any known method, and for example, is obtained by melt kneading all together 30 to 80 parts by weight of a non-crosslinked or partially crosslinked olefin-based thermoplastic elastomer (X), 0 to 40 parts by weight of a propylene-based polymer (Y), 5 to 60 parts by weight of a propylene α-olefin copolymer (Z) (wherein the total of (X), (Y) and (Z) is 100 parts by weight), and other components that are added as desired, using an extruder, a kneader or the like. In another embodiment, the composition is obtained by melt kneading all together 30 to 80 parts by weight of a non-crosslinked or partially crosslinked olefin-based thermoplastic elastomer (X), 0 to 40 parts by weight of a propylene-based polymer (Y), 5 to 60 parts by weight of a propylene•α-olefin copolymer (ZZ) (wherein the total of (X), (Y) and (ZZ) is 100 parts by weight), and other components that are added as desired, using an extruder, a kneader or the like.

Molded Product

The propylene-based polymer composition as described above according to the present invention can be widely used in the conventionally known applications of polyolefin, and in particular, the polyolefin composition can be used by molding into molded products of various shapes such as, for example, sheet, unstretched or stretched film, pipe, wire coating, filament and the like.

For the molded product, specifically the molded products obtained by known thermoforming processes such as extrusion molding, injection molding, inflation molding, blow molding, extrusion blow molding, injection blow molding, press molding, vacuum molding, calendar molding, foam molding and the like, may be mentioned. Hereafter, various examples of the molded products will be explained.

If the molded product according to the present invention is, for example, an extrusion molded product or injection molded product, the shape and product type are not particularly limited, but for example, sheet, film (unstretched), pipe, hose, wire coating, filament and the like may be mentioned, with sheet, skin material, material for automobile interior and exterior decoration, construction material and the like being particularly preferred.

When the propylene-based polymer composition is to be extrusion molded or injection molded, conventionally known extrusion molding apparatuses, injection molding apparatuses and molding conditions can be employed. Also, at the time of extrusion molding, crosslinking treatment with an electron beam or γ-ray may be also performed.

According to the present invention, a propylene-based copolymer composition which retains rubber elasticity and is excellently balanced in abrasion resistance and thermal resistance can be obtained by blending the above-described specific propylene-based copolymer with a non-crosslinked or partially crosslinked olefin-based thermoplastic resin.

EXAMPLES

Hereinafter, the present invention will be described in more detail with reference to the Examples, but the present invention is not intended to be limited by these Examples.

The properties testing conditions used for the present invention will be described in the following.

1. Permanent Set;

A dumbbell-shaped specimen having a length of 50 mm, a width of 5 mm and a thickness of 1 mm was subjected to 100% strain (up to 60 mm of the interval between chucks) with an interval between gauge marks of 30 mm and a stress rate of 30 mm/min, was maintained for 10 minutes, and then the length between gauge marks (L) 10 minutes after the removal of stress was measured.

$$\text{Permanent set}(\%) = [(L-30)/30] \times 100$$

2. Tensile Modulus;

It was measured according to JIS K6301, using a JIS No. 3 dumbbell, at a span interval of 30 mm and a stress rate of 30 mm/min at 23° C.

3. Thermal Resistance (TMA): Softening Temperature (° C.);

The softening temperature (° C.) was determined from a TMA curve according to JIS K7196 using a specimen having a thickness of 1 mm, at a heating rate of 5° C./min, by applying a pressure of 2 kg/cm² onto a flat indenter with 1.8 mmφ. In the present specification, this softening temperature may be referred to as TMA.

4. Haze (%);

The haze was measured with a digital hazemeter "NDH-20 D" manufactured by Nippon Denshoku Kogyo K.K., using a 1 mm-thick specimen.

5. Abrasion Resistance Test

Using a Gakushin type abrasion testing machine manufactured by Toyo Seiki Kogyo Co., Ltd., and using a 2 mm-thick specimen, a sample was abraded with 470 g of 45 R abrasion indenters made of SUS, with the tips being covered with cotton duck #10, at 23° C., a shuttling number of 100 times, a shuttling rate of 33 times/min, and a stroke of 100 mm, and the gloss change rate, ΔGloss, before and after the abrasion was determined as follows.

ΔGloss=[(Gloss before abrasion−Gloss after abrasion)/Gloss before abrasion]×100

6. Whitening Resistance Test

A specimen having a size of 10 cm×10 cm×1 mm t was folded to 180° in bilateral symmetry, and a cylindrical weight having a radius of 5 cm and a weight of 10 kg was loaded on the folded specimen for 1 hour. Thereafter, the degree of whitening was observed with naked eyes and was evaluated according to the following criteria.

○: No whitening
Δ: Little whitening
x: Noticeable whitening

7. Izod Impact Strength

The Izod impact strength was determined by performing an impact test under the following conditions, using an injection molding specimen and according to ASTM D-256.

<Testing Conditions>

Specimen: 12.7 mm (width)×6.4 mm (thickness)×64 mm (length)

Notch: Machine processing

Measurement temperature: 0° C. and −30° C.

8. Heat Sealability <Heat Seal Strength (HST) (g/15 mm Width)>;

Using a cast film molding machine, a testing film having a width of 250 mm and a thickness of 50 μm was produced under the conditions of a cylinder temperature of 230° C., a chill roll temperature of 20° C. and a screw rotation speed of 80 rpm, and the heat sealability was measured at a heat seal pressure of 2 kg/cm², a heat sealing time of 1 sec, and a stress rate of 300 mm/min.

9. Melting Point (Tm) and Glass Transition Temperature (Tg)

An endotherm curve of DSC was determined, and the temperature at the maximum peak position was taken as Tm. The measurement was conducted and determined from an endotherm curve obtained when a sample was filled in an aluminum pan and was heated to 200° C. at a rate of 100° C./min, maintained at 200° C. for 10 minutes, then cooled at a rate of 100° C./min to −150° C. at a rate of 10° C./min, and subsequently heated at a rate of 10° C./min.

10. Intrinsic Viscosity [η]

The intrinsic viscosity was measured at 135° C. in decalin.

11. Mw/Mn

The molecular weight distribution was measured using GPC (gel permeation chromatography) in ortho-dichlorobenzene solvent at 140° C.

12. JIS A Hardness;

The JIS A hardness (HS) was measured according to JIS K6301.

Synthesis Example 1

[Synthesis of Propylene•Butene•Ethylene Copolymer (S-1)]

100 ml of dry hexane, 480 g of 1-butene and triisobutylaluminum (1.0 mmol) were introduced at normal temperature into a polymerization apparatus of 2000 ml, which had been sufficiently purged with nitrogen. Then, the temperature in the polymerization apparatus was raised to 35° C., and the polymerization apparatus was pressurized with propylene to 0.6 MPa and then pressurized with ethylene to 0.62 MPa. Thereafter, a toluene solution in which 0.005 mmol of diphenylmethylene(cyclopentadienyl)fluorenylzirconium dichloride and 1.5 mmol (in terms of aluminum) of methylaluminoxane (Tosoh Finethem Corp.) were contacted was added to the polymerization vessel, and polymerization was conducted for 5 minutes while maintaining the internal temperature at 35° C. and the ethylene pressure at 0.62 MPa. 20 ml of methanol was added to terminate the polymerization. After depressurizing, a polymer was precipitated out from the polymerization solution in 2 L of methanol, and was dried in a vacuum at 130° C. for 12 hours. 36.1 g of the polymer was obtained. The polymer had a composition of 58.2% by mole of propylene, 4.1% by mole of ethylene, and 37.7% by mole of 1-butene, and had an intrinsic viscosity [η] of 2.69 dl/g, a glass transition temperature Tg of −18.3° C., no melting peak, and a molecular weight distribution by GPC of 2.4. Further, the absorption intensity ratios measured by $^{13}$C-NMR were (A/C)×100=4, and (B/C)×100=78.

The sample was used to form a 1 mm-thick sheet, by preheating at a heating plate temperature of 190° C. for 6 min, molding under pressure (100 kg/cm²) for 2 minutes, and then cooling under pressure (100 kg/cm²) after transferring to a press molding machine at a heating plate temperature of 20° C. The sheet properties are presented in the following.

JIS A hardness: 54, tensile modulus: 4 MPa, ΔGloss: 10%

The properties measured for the obtained polymer are presented in Table 1.

Synthesis Example 2

[Synthesis of Propylene•Butene•Ethylene Copolymer (S-2)]

Polymerization was carried out in the same manner as in Synthesis Example 1, except that 500 ml of hexane was introduced, and the amount of 1-butene was 240 g. 39.2 g of the polymer was obtained. The polymer had a composition of 67.9% by mole of propylene, 5.1% by mole of ethylene, and 27.0% by mole of 1-butene, and had an intrinsic viscosity [η] of 2.89 dl/g, a glass transition temperature Tg of −19.7° C., no melting peak, and a molecular weight distribution by GPC of 2.0. Further, the absorption intensity ratios measured by $^{13}$C-NMR were (A/C)×100=3, and (B/C)×100=81.

The sample was used to form a 1 mm-thick sheet, by preheating at a heating plate temperature of 190° C. for 6 min, molding under pressure (100 kg/cm²) for 2 minutes, and then cooling under pressure (100 kg/cm²) after transferring to a press molding machine at a heating plate temperature of 20° C. The sheet properties are presented in the following.

JIS A hardness: 51, tensile modulus: 2 MPa, ΔGloss: 7%

The properties measured for the obtained polymer are presented in Table 1.

Synthesis Example 3

[Synthesis of Propylene•Butene•Ethylene Copolymer (S-3)]

Polymerization was carried out in the same manner as in Synthesis Example 2, except that the system was pressurized with propylene to 5.4 MPa. 82.6 g of the polymer was obtained. The polymer had a composition of 61.3% by mole of propylene, 10.3% by mole of ethylene, and 28.4% by mole of 1-butene, and had an intrinsic viscosity [η] of 2.67 dl/g, a glass transition temperature Tg of –24.7° C., no melting peak, and a molecular weight distribution by GPC of 2.0. Further, the absorption intensity ratios measured by $^{13}$C-NMR were (A/C)×100=3, and (B/C)×100=79.

The sample was used to form a 1 mm-thick sheet, by preheating at a heating plate temperature of 190° C. for 6 min, molding under pressure (100 kg/cm$^2$) for 2 minutes, and then cooling under pressure (100 kg/cm$^2$) after transferring to a press molding machine at a heating plate temperature of 20° C. The sheet properties are presented in the following.

JIS A hardness: 51, tensile modulus: 2 MPa, ΔGloss: 20%

The properties measured for the obtained polymer are presented in Table 1.

Synthesis Example 4

[Synthesis of Propylene•Butene•Ethylene Copolymer (S-4)]

Polymerization was carried out in the same manner as in Synthesis Example 2, except that diphenylmethylene(cyclopentadienyl)fluorenylzirconium dichloride was changed to diphenylmethylene(cyclopentadienyl)(octamethyldihydrobenzoyl fluorenyl)zirconium dichloride. 48.3 g of the polymer was obtained. The polymer had a composition of 64.3% by mole of propylene, 8.3% by mole of ethylene, and 27.4% by mole of 1-butene, and had an intrinsic viscosity [η] of 3.67 dl/g, a glass transition temperature Tg of –22.1° C., no melting peak, and a molecular weight distribution by GPC of 2.0. Further, the absorption intensity ratios measured by $^{13}$C-NMR were (A/C)×100=3, and (B/C)×100=81.

The sample was used to form a 1 mm-thick sheet, by preheating at a heating plate temperature of 190° C. for 6 min, molding under pressure (100 kg/cm$^2$) for 2 minutes, and then cooling under pressure (100 kg/cm$^2$) after transferring to a press molding machine at a heating plate temperature of 20° C. The sheet properties are presented in the following.

JIS A hardness: 54, tensile modulus: 4 MPa, ΔGloss: 9%

The properties measured for the obtained polymer are presented in Table 1.

Synthesis Example 5

[Synthesis of Propylene•Butene•Ethylene Copolymer (S-5)]

Polymerization was carried out in the same manner as in Synthesis Example 3, except that the system was pressurized with propylene to 0.47 MPa. 120.1 g of the polymer was obtained. The polymer had a composition of 40.8% by mole of propylene, 23.5% by mole of ethylene, and 35.7% by mole of 1-butene, and had an intrinsic viscosity [η] of 1.52 dl/g, a glass transition temperature Tg of –36.3° C., no melting peak, and a molecular weight distribution by GPC of 2.0.

Further, the absorption intensity ratios measured by $^{13}$C-NMR were (A/C)×100=4, and (B/C)×100=82.

The sample was used to form a 1 mm-thick sheet, by preheating at a heating plate temperature of 190° C. for 6 min, molding under pressure (100 kg/cm$^2$) for 2 minutes, and then cooling under pressure (100 kg/cm$^2$) after transferring to a press molding machine at a heating plate temperature of 20° C. The sheet properties are presented in the following.

JIS A hardness: 45, tensile modulus: 2 MPa, ΔGloss: 60%

The properties measured for the obtained polymer are presented in Table 1.

Synthesis Example 6

[Synthesis of Propylene•Butene Copolymer (S-6)]

717 ml of dry hexane, 20 g of 1-butene and triisobutylaluminum (0.75 mmol) were introduced at normal temperature into a polymerization apparatus of 1500 ml, which had been sufficiently purged with nitrogen. Then, the temperature in the polymerization apparatus was raised to 70° C., and the polymerization apparatus was pressurized with propylene to 0.6 MPa. Thereafter, a toluene solution in which 0.075 mmol of diphenylmethylene(cyclopentadienyl)fluorenylzirconium dichloride and 0.45 mmol (in terms of aluminum) of methylaluminoxane (Tosoh Finechem Corp.) were contacted was added to the polymerization vessel, and polymerization was conducted for 30 minutes while maintaining the internal temperature at 70° C. and the propylene pressure at 0.6 MPa. 20 ml of methanol was added to terminate the polymerization. After depressurizing, a polymer was precipitated out from the polymerization solution in 2 L of methanol, and was dried in a vacuum at 130° C. for 12 hours. 100.2 g of the polymer was obtained. The polymer had a melting point of 87.6° C., an intrinsic viscosity [η] of 1.40 dl/g, a butene content of 20.3% by mole, and a glass transition temperature of –5.6° C. The molecular weight distribution (Mw/Mn) measured by GPC was 2.3. Further, the absorption intensity ratios measured by $^{13}$C-NMR were (A/C)×100=2, and (B/C)×100=80.

Synthesis Example 7

[Synthesis of Propylene•Butene Copolymer (S-7)]

677 ml of dry hexane, 50 g of 1-butene and triisobutylaluminum (0.75 mmol) were introduced at normal temperature into a polymerization apparatus of 1500 ml, which had been sufficiently purged with nitrogen. Then, the temperature in the polymerization apparatus was raised to 70° C., and the polymerization apparatus was pressurized with propylene to 0.6 MPa. Thereafter, a toluene solution in which 0.075 mmol of diphenylmethylene(cyclopentadienyl)fluorenylzirconium dichloride and 0.45 mmol (in terms of aluminum) of methylaluminoxane (Tosoh Finechem Corp.) were contacted was added to the polymerization vessel, and polymerization was conducted for 37 minutes while maintaining the internal temperature at 70° C. and the propylene pressure at 0.6 MPa. 20 ml of methanol was added to terminate the polymerization. After depressurizing, a polymer was precipitated out from the polymerization solution in 2 L of methanol, and was dried in a vacuum at 130° C. for 12 hours. 124.1 g of the polymer was obtained. The polymer had a melting point of 77.2° C., an intrinsic viscosity [η] of 1.18 dl/g, a butene content of 27.6% by mole, and a glass transition temperature of –6.8° C. The molecular weight distribution (Mw/Mn) measured by GPC was 2.2. Further, the absorption intensity ratios measured by $^{13}$C-NMR were (A/C)×100=4, and (B/C)×100=79.

Synthesis Example 8

[Synthesis of Propylene•Butene Copolymer (S-8)]

500 ml of dry hexane, 150 g of 1-butene and triisobutylaluminum (0.75 mmol) were introduced at normal temperature into a polymerization apparatus of 1500 ml, which had been sufficiently purged with nitrogen. Then, the temperature in the polymerization apparatus was raised to 30° C., and the polymerization apparatus was pressurized with propylene to 0.6 MPa. Thereafter, a toluene solution in which 0.0325 mmol of diphenylmethylene(cyclopentadienyl)fluorenylzirconium dichloride and 0.45 mmol (in terms of aluminum) of methylaluminoxane (Tosoh Finechem Corp.) were contacted was added to the polymerization vessel, and polymerization was conducted for 30 minutes while maintaining the internal temperature at 30° C. and the propylene pressure at 0.6 MPa. 20 ml of methanol was added to terminate the polymerization. After depressurizing, a polymer was precipitated out from the polymerization solution in 2 L of methanol, and was dried in a vacuum at 130° C. for 12 hours. 109.0 g of the polymer was obtained. The polymer did not have a melting point, but had an intrinsic viscosity [η] of 2.15 dl/g, a butene content of 35.6% by mole, and a glass transition temperature of −10.6° C. The molecular weight distribution (Mw/Mn) measured by GPC was 2.3. Further, the absorption intensity ratios measured by $^{13}$C-NMR were (A/C)×100=4, and (B/C)×100=73.

Synthesis Example 9

[Synthesis of Propylene-Octene Copolymer (S-9)]

500 ml of dry hexane, 150 g of 1-octene and triisobutylaluminum (2.25 mmol) were introduced at normal temperature into a polymerization apparatus of 1500 ml, which had been sufficiently purged with nitrogen. Then, the temperature in the polymerization apparatus was raised to 30° C., and the polymerization apparatus was pressurized with propylene to 0.6 MPa. Thereafter, a toluene solution in which 0.075 mmol of diphenylmethylene(cyclopentadienyl)fluorenylzirconium dichloride and 0.45 mmol (in terms of aluminum) of methylaluminoxane (Tosoh Finechem Corp.) were contacted was added to the polymerization vessel, and polymerization was conducted for 30 minutes while maintaining the internal temperature at 70° C. and the propylene pressure at 0.6 MPa. 20 ml of methanol was added to terminate the polymerization. After depressurizing, a polymer was precipitated out from the polymerization solution in 2 L of methanol, and was dried in a vacuum at 130° C. for 12 hours. 51.2 g of the polymer was obtained. The polymer had a melting point of 87.6° C., an intrinsic viscosity [η] of 2.57 dl/g, an octene content of 20.1% by mole, and a glass transition temperature of −19.6° C. The molecular weight distribution (Mw/Mn) measured by GPC was 2.4.

Synthesis Example 10

[Synthesis of Propylene•Butene Copolymer (S-10)]

833 ml of dry hexane, 150 g of 1-butene and triisobutylaluminum (1.0 mmol), and then a toluene solution in which 0.001 mmol of diphenylmethylene(cyclopentadienyl)fluorenylzirconium dichloride and 0.3 mmol (in terms of aluminum) of methylaluminoxane (Tosoh Finechem Corp.) were contacted, were introduced into a polymerization apparatus of 2000 ml, which had been sufficiently purged with nitrogen. Then, the temperature in the polymerization apparatus was raised to 40° C., and the inside of the system was pressurized with propylene to 0.76 MPa. Polymerization was conducted for 20 minutes while maintaining the internal temperature at 40° C. and the pressure inside the system at 0.76 MPa with propylene. 20 ml of methanol was added to terminate the polymerization. After depressurizing, a polymer was precipitated out from the polymerization solution in 2 L of methanol, and was dried in a vacuum at 130° C. for 12 hours. 10.4 g of the polymer was obtained.

The intrinsic viscosity [η] measured at 135° C. in decalin was 1.81 dl/g, the glass transition temperature Tg was −14° C., no melting peak was observed, and a butene content was 44.0% by mole. The molecular weight distribution (Mw/Mn) measured by GPC was 2.1. Further, the absorption intensity ratios measured by $^{13}$C-NMR were (A/C)×100=5, and (B/C)×100=70.

The sample was used to form a 1 mm-thick sheet, by preheating at a heating plate temperature of 190° C. for 6 min, molding under pressure (100 kg/cm$^2$) for 2 minutes, and then cooling under pressure (100 kg/cm$^2$) after transferring to a press molding machine at a heating plate temperature of 20° C. The sheet properties are presented in the following.

JIS A hardness: 95, tensile modulus: 120 MPa, ΔGloss: 10%

The properties measured for the obtained polymer are presented in Table 1.

Synthesis Example 11

[Synthesis of Propylene•Ethylene Copolymer (S-11)]

750 ml of heptane was added at normal temperature to a 1.5-liter autoclave, which had been dried under reduced pressure and purged with nitrogen, and subsequently 0.3 ml of a 1.0 mmol/ml toluene solution of triisobutylaluminum was added thereto such that the total amount added was 0.3 mmol in terms of aluminum atoms. 50.7 liters of propylene (25° C., 1 atmosphere) was introduced to the autoclave with stirring, and the system was heated to reach 30° C. Then, the system was pressurized with ethylene to 5.5 kg/cm$^2$G, and 3.75 ml of a heptane solution (0.0002 mM/ml) of diphenylmethylene (cyclopentadienyl)(fluorenyl)zirconium dichloride synthesized by a known method, and 2.0 ml of a toluene solution (0.002 mM/ml) of triphenylcarbenium tetra(pentafluorophenyl)borate were added to the system to initiate copolymerization of propylene and ethylene. The catalyst concentrations at this time were 0.001 mmol/l of diphenylmethylene(cyclopentadienyl)(fluorenyl)zirconium dichloride and 0.004 mmol/l of triphenylcarbenium tetra(pentrafluorophenyl)borate based on the whole system.

During the polymerization, the internal pressure was maintained at 5.5 kg/cm$^2$G by continuously supplying ethylene. After 30 minutes of polymerization initiation, the polymerization reaction was terminated by adding methyl alcohol. After depressurizing, the polymer solution was taken out, and this polymer solution washed using an aqueous solution prepared by adding 5 ml of concentrated hydrochloric acid to 1 liter of water, at a ratio of 1:1 with respect to the polymer solution, to transfer the catalyst residues to the aqueous phase. This catalyst mixed solution was left to stand, and then the aqueous phase was separated and removed, which was then further washed two times with distilled water to separate the polymerization solution into an oil phase and an aqueous phase. Subsequently, the oil-water separated polymerization solution was contacted with 3 times the volume of acetone under vigorous stirring to precipitate the polymer. Then, the precipitate was sufficiently washed with acetone, and the solid portion (copolymer) was collected through filtration, which was then dried at 130° C. and at 350 mmHg for 12 hours under a nitrogen stream.

The propylene•ethylene copolymer thus obtained had an intrinsic viscosity [η] of 2.4 dl/g as measured at 135° C. in decalin, a glass transition temperature of −28° C., an ethylene content of 20% by mole, and a molecular weight distribution (Mw/Mn) measured by GPC of 2.9. Further, the absorption intensity ratios measured by $^{13}$C-NMR were (A/C)×100=4, and (B/C)×100=78.

Synthesis Example 12

[Synthesis of Isotactic Propylene•Ethylene•Butene Copolymer (S-12)]

833 ml of dry hexane, 100 g of 1-butene and triisobutylaluminum (1.0 mmol) were introduced at normal temperature into a polymerization apparatus of 2000 ml, which had been sufficiently purged with nitrogen. Then, the temperature in the polymerization apparatus was raised to 40° C., and the polymerization apparatus was pressurized with propylene to 0.76 MPa, and then adjusted with ethylene to be 0.8 MPa of pressure. Thereafter, a toluene solution in which 0.001 mmol of dimethylmethylene(3-tert-butyl-5-methylcyclopentadienyl)fluorenylzirconium dichloride and 0.3 mmol (in terms of aluminum) of methylaluminoxane (Tosoh Finechem Corp.) were contacted was added to the polymerization vessel, and polymerization was conducted for 20 minutes while maintaining the internal temperature at 40° C. and the pressure inside the system at 0.8 MPa with ethylene. 20 ml of methanol was added to terminate the polymerization. After depressurizing, a polymer was precipitated out from the polymerization solution in 2 L of methanol, and was dried in a vacuum at 130° C. for 12 hours. 46.4 g of the polymer was obtained.

The obtained polymer had an intrinsic viscosity [η] of 1.81 dl/g as measured at 135° C. in decalin, a glass transition temperature Tg of −27.6° C., no melting peak, an ethylene content of 17.0% by mole, a butene content of 9.2% by mole, and a molecular weight distribution measured by GPC of 2.2.

Synthesis Example 13

[Synthesis of Syndiotactic Polypropylene (A-1)]

According to the method described in JP-A-2-274763, a syndiotactic polypropylene was obtained by bulk polymerization of propylene in the presence of hydrogen, using a catalyst comprising diphenylmethylene(cyclopentadienyl)fluorenylzirconium dichloride and methylaluminoxane. The melt flow index of the syndiotactic polypropylene was 4.4 g/10 min, the molecular weight distribution measured by GPC was 2.3, the syndiotactic pentad fraction (rrrr) Measured by $^{13}$C-NMR was 0.823, and Tm and Tc measured by differential scanning calorimetry were 127° C. and 57° C., respectively.

Various properties of the copolymers obtained in Synthesis Examples 1 through 12 are presented in Table 1.

TABLE 1

|  | Syn. Ex. 1 S-1 | Syn. Ex. 2 S-2 | Syn. Ex. 3 S-3 | Syn. Ex. 4 S-4 | Syn. Ex. 5 S-5 | Syn. Ex. 6 S-6 | Syn. Ex. 7 S7 | Syn. Ex. 8 S-8 | Syn. Ex. 9 S-9 | Syn. Ex. 10 S-10 | Syn. Ex. 11 S-11 | Syn. Ex. 12 S-12 |
|---|---|---|---|---|---|---|---|---|---|---|---|---|
| Propylene content (mol %) | 58.2 | 67.9 | 61.3 | 64.3 | 40.8 | 79.7 | 72.4 | 64.4 | 79.9 | 56 | 80 | 73.8 |
| Ethylene content (mol %) | 4.1 | 5.1 | 10.3 | 8.3 | 23.5 |  |  |  |  |  | 20 | 17 |
| 1-Butene content (mol %) | 37.7 | 27 | 28.4 | 27.4 | 35.7 | 20.3 | 27.6 | 35.6 |  | 44 |  | 92 |
| 1-Octene content (mol %) |  |  |  |  |  |  |  |  | 20.1 |  |  |  |
| Intrinsic viscosity [η] (dl/g) | 2.69 | 2.89 | 2.67 | 3.67 | 1.52 | 1.4 | 1.18 | 2.15 | 2.57 | 1.81 | 2.4 | 1.81 |
| Glass transition temperature Tg (° C.) | −18.3 | −19.7 | −24.7 | −22.1 | −36.3 | −5.6 | −6.8 | −10.6 | −19.6 | −14 | −28 | −27.6 |
| Melting point Tm (° C.) | — | — | — | — | — | 87.6 | 77.2 | — | 87.6 | — | — | — |
| Mw/Mn | 2.4 | 2 | 2 | 2 | 2 | 2.3 | 2.2 | 2.3 | 2.4 | 2.1 | 2.9 | 2.2 |
| JIS A hardness | 54 | 51 | 51 | 54 | 45 | — | — | — | — | 95 | — | — |
| YM (MPa) | 4 | 2 | 2 | 4 | 2 | — | — | — | — | 120 | — | — |
| ΔGloss (%) | 10 | 7 | 20 | 9 | 60 | — | — | — | — | 10 | — | — |

Example 1

10 parts by weight of an isotactic polypropylene (iso-PP) (grade: B101, MFR=0.5, melting point 165° C.) (IIa) manufactured by Mitsui Chemicals Inc., and 90 parts by weight of the propylene•ethylene•butene copolymer (S-1) obtained in Synthesis Example 1 were mixed and melt kneaded to obtain a thermoplastic resin composition.

The tensile modulus of this composition was 17 MPa, the TMA was 126° C., the gloss change rate, ΔGloss, was 10, the permanent set was 6, the JIS A hardness was 74, and the haze was 7.

The properties measured for the obtained resin composition are presented in Table 2.

Example 2

A thermoplastic resin composition was obtained in the same manner as in Example 1, except that the amount of the isotactic polypropylene (iso-PP) (grade: B101, MFR=0.5, melting point: 165° C.) (IIa) manufactured by Mitsui Chemicals Inc. used in Example 1 was changed to 20 parts by weight, and the amount of the propylene•ethylene•butene copolymer (S-1) obtained in Synthesis Example 1 was changed to 80 parts by weight. The properties measured for the obtained resin composition are presented in Table 2.

The tensile modulus of this composition was 27 MPa, the TMA was 155° C., the gloss change range, ΔGloss, was 10, the permanent set was 8, the JIS A hardness was 82, and the haze was 10.

Example 3

A thermoplastic resin composition was obtained in the same manner as in Example 1, except that the propylene•ethylene•butene copolymer (S-1) obtained in Synthesis Example 1 was changed to the propylene•ethylene•butene copolymer (S-2) obtained in Synthesis Example 2.

The tensile modulus of this composition was 34 MPa, the TMA was 134° C., the gloss change range, ΔGloss, was 8, the permanent set was 8, the JIS A hardness was 85, and the haze was 6. The properties measured for the obtained resin composition are presented in Table 2.

Example 4

A thermoplastic resin composition was obtained in the same manner as in Example 2, except that the propylene•ethylene•butene copolymer (S-1) obtained in Synthesis Example 1 was changed to the propylene•ethylene•butene copolymer (S-2) obtained in Synthesis Example 2.

The tensile modulus of this composition was 44 MPa, the TMA was 154° C., the gloss change range, ΔGloss, was 9, the permanent set was 8, the JIS A hardness was 88, and the haze was 7. The properties measured for the obtained resin composition are presented in Table 2.

Example 5

A thermoplastic resin composition was obtained in the same manner as in Example 1, except that the propylene•ethylene•butene copolymer (S-1) obtained in Synthesis Example 1 was changed to the propylene•ethylene•butene copolymer (S-3) obtained in Synthesis Example 3.

The tensile modulus of this composition was 17 MPa, the TMA was 134° C., the gloss change range, ΔGloss, was 11, the permanent set was 8, the JIS A hardness was 76, and the haze was 9. The properties measured for the obtained resin composition are presented in Table 2.

Example 6

A thermoplastic resin composition was obtained in the same manner as in Example 2, except that the propylene•ethylene•butene copolymer (S-1) obtained in Synthesis Example 1 was changed to the propylene•ethylene•butene copolymer (S-3) obtained in Synthesis Example 3.

The tensile modulus of this composition was 24 MPa, the TMA was 154° C., the gloss change range, ΔGloss, was 10, the permanent set was 8, the JIS A hardness was 82, and the haze was 8. The properties measured for the obtained resin composition are presented in Table 2.

Example 7

A thermoplastic resin composition was obtained in the same manner as in Example 2, except that the propylene•ethylene•butene copolymer (S-1) obtained in Synthesis Example 1 was changed to the propylene•ethylene•butene copolymer (S-4) obtained in Synthesis Example 4.

The tensile modulus of this composition was 27 MPa, the TMA was 156° C., the gloss change range, ΔGloss, was 7, the permanent set was 7, the JIS A hardness was 81, and the haze was 8. The properties measured for the obtained resin composition are presented in Table 2.

Example 8

A thermoplastic resin composition was obtained in the same manner as in Example 2, except that the propylene•ethylene•butene copolymer (S-1) obtained in Synthesis Example 1 was changed to the propylene•ethylene•butene copolymer (S-5) obtained in Synthesis Example 5.

The tensile modulus of this composition was 24 MPa, the TMA was 126° C., the gloss change range, ΔGloss, was 47, the permanent set was 9, the JIS A hardness was 81, and the haze was 38. The properties measured for the obtained resin composition are presented in Table 2.

Comparative Example 1

A thermoplastic resin composition was obtained in the same manner as in Example 2, except that the propylene•ethylene•butene copolymer (S-1) obtained in Synthesis Example 1 was changed to the propylene•butene copolymer (S-10) obtained in Synthesis Example 10.

The tensile modulus of this composition was 184 MPa, the TMA was 154° C., the gloss change range, ΔGloss, was 9, the permanent set was 28, the JIS A hardness was 95, and the haze was 14. The properties measured for the obtained resin composition are presented in Table 2.

Comparative Example 2

A thermoplastic resin composition was obtained in the same manner as in Example 2, except that the propylene•ethylene butene copolymer (S-1) obtained in Synthesis Example 1 was changed to the propylene•ethylene copolymer (S-11) obtained in Synthesis Example 11.

The tensile modulus of this composition was 14 MPa, the TMA was 64° C., the gloss change range, ΔGloss, was 59, the permanent set was 28, the JIS A hardness was 75, and the haze was 74. The properties measured for the obtained resin composition are presented in Table 2.

Comparative Example 3

A thermoplastic resin composition was obtained in the same manner as in Example 2, except that the propylene•ethylene•butene copolymer (S-1) obtained in Synthesis Example 1 was changed to the propylene•ethylene•butene copolymer (S-12) obtained in Synthesis Example 12.

The tensile modulus of this composition was 24 MPa, the TMA was 154° C., the gloss change range, ΔGloss, was 39, the permanent set was 8, the JIS A hardness was 82, and the haze was 12. The properties measured for the obtained resin composition are presented in Table 2.

TABLE 2

|  |  | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 |
|---|---|---|---|---|---|---|---|---|---|---|---|---|
| Resin composition | Propylene·ethylene·butene copolymer (S-1) | 90 | 80 | | | | | | | | | |
| | Propylene·ethylene·butene copolymer (S-2) | | | 90 | 80 | | | | | | | |
| | Propylene·ethylene·butene copolymer (S-3) | | | | | 90 | 80 | | | | | |
| | Propylene·ethylene·butene copolymer (S-4) | | | | | | | 80 | | | | |
| | Propylene·ethylene·butene copolymer (S-5) | | | | | | | | 80 | | | |
| | Propylene·butene copolymer (S-10) | | | | | | | | | 80 | | |
| | Propylene·ethylene copolymer (S-11) | | | | | | | | | | 80 | |
| | Propylene·ethylene·butene copolymer (S-12) | | | | | | | | | | | 80 |
| | Iso-PP (IIa) | 10 | 20 | 10 | 20 | 10 | 20 | 20 | 20 | 20 | 20 | 20 |
| Properties of resin composition | Tensile modulus (MPa) | 17 | 27 | 34 | 44 | 17 | 24 | 27 | 24 | 184 | 14 | 24 |
| | TMA (° C.) | 126 | 155 | 134 | 154 | 134 | 154 | 156 | 126 | 154 | 64 | 154 |
| | ΔGloss (%) | 10 | 10 | 8 | 9 | 11 | 10 | 7 | 47 | 9 | 59 | 49 |
| | Permanent set (%) | 6 | 8 | 8 | 8 | 8 | 8 | 7 | 9 | 28 | 28 | 8 |
| | JIS A hardness | 74 | 82 | 85 | 88 | 76 | 82 | 81 | 81 | 95 | 75 | 82 |
| | Haze | 7 | 10 | 6 | 7 | 9 | 8 | 8 | 38 | 14 | 74 | 12 |

Example 9

10 parts by weight of the syndiotactic polypropylene (syndio-PP) (A-1) obtained in Synthesis 13 as a thermoplastic resin (IIb), and 90 parts by weight of the propylene·ethylene·butene copolymer (S-3) obtained in Synthesis Example 3 were mixed and melt kneaded to obtain a thermoplastic resin composition.

The tensile modulus of this composition was 7 MPa, the TMA was 106° C., the gloss change range, ΔGloss, was 9, the permanent set was 6, the JIS A hardness was 74, and the haze was 7. The properties measured for the obtained resin composition are presented in Table 3.

Example 10

A thermoplastic resin composition was obtained in the same manner as in Example 9, except that the amount of the syndiotactic polypropylene (syndio-PP) (A-1) obtained in Synthesis Example 13 was changed to 20 parts by weight, and the amount of the propylene·ethylene·butene copolymer (S-3) obtained in Synthesis Example 3 was changed to 80 parts by weight.

The tensile modulus of this composition was 24 MPa, the TMA was 116° C., the gloss change range, ΔGloss, was 5, the permanent set was 8, the JIS A hardness was 83, and the haze was 10. The properties measured for the obtained resin composition are presented in Table 3.

Example 11

A thermoplastic resin composition was obtained in the same manner as in Example 10, except that the propylene·ethylene·butene copolymer (S-3) obtained in Synthesis Example 3 was changed to the propylene·ethylene·butene copolymer (S-4) obtained in Synthesis Example 4.

The tensile modulus of this composition was 17 MPa, the TMA was 114° C., the gloss change range, ΔGloss, was 6, the permanent set was 8, the JIS A hardness was 80, and the haze was 10. The properties measured for the obtained resin composition are presented in Table 3.

Example 12

A thermoplastic resin composition was obtained in the same manner as in Example 10, except that the propylene·ethylene·butene copolymer (S-3) obtained in Synthesis Example 3 was changed to the propylene·ethylene·butene copolymer (S-5) obtained in Synthesis Example 5.

The tensile modulus of this composition was 17 MPa, the TMA was 100° C., the gloss change range, ΔGloss, was 16, the permanent set was 10, the JIS A hardness was 80, and the haze was 20. The properties measured for the obtained resin composition are presented in Table 3.

Comparative Example 4

A thermoplastic resin composition was obtained in the same manner as in Example 10, except that the propylene·ethylene·butene copolymer (S-3) obtained in Synthesis Example 3 was changed to the propylene·butene copolymer (S-10) obtained in Synthesis Example 10.

The tensile modulus of this composition was 164 MPa, the TMA was 120° C., the gloss change range, ΔGloss, was 5, the permanent set was 28, the JIS A hardness was not less than 95, and the haze was 14. The properties measured for the obtained resin composition are presented in Table 3.

Comparative Example 5

A thermoplastic resin composition was obtained in the same manner as in Example 10, except that the propylene·ethylene·butene copolymer (S-3) obtained in Synthesis Example 3 was changed to the propylene·ethylene copolymer (S-11) obtained in Synthesis Example 11.

The tensile modulus of this composition was 19 MPa, the TMA was 102° C., the gloss change range, ΔGloss, was 25, the permanent set was 8, the JIS A hardness was 81, and the haze was 8. The properties measured for the obtained resin composition are presented in Table 3.

Comparative Example 6

A thermoplastic resin composition was obtained in the same manner in the same manner as in Example 10, except that the propylene•ethylene•butene copolymer (S-3) obtained in Synthesis Example 3 was changed to the propylene•ethylene•butene copolymer (S-12) obtained in Synthesis Example 12.

The tensile modulus of this composition was 19 MPa, the TMA was 102° C., the gloss change range, ΔGloss, was 35, the permanent set was 14, the JIS A hardness was 81, and the haze was 38. The properties measured for the obtained resin composition are presented in Table 3.

mer (S-6) obtained in Synthesis Example 6. The obtained properties are presented in Table 4.

Example 16

A polypropylene resin composition was obtained in the same manner as in Example 13, except that the propylene-octene copolymer (S-9) obtained in Synthesis Example 9 was used instead of the propylene•butene copolymer (S-6) obtained in Synthesis Example 6. The obtained properties are presented in Table 4.

Example 17

A polypropylene resin composition was obtained by mixing 80 parts by weight of an isotactic polypropylene random copolymer (grade: F337D, MFR=6.5, ethylene content=3.1 wt %, melting point 138° C.) (A-2) manufactured by Mitsui Chemicals, Inc., and 20 parts by weight of the propylene•butene copolymer (S-7) obtained in Synthesis Example 7, and melt kneading the mixture. The obtained properties are presented in Table 4.

TABLE 3

|  |  | Ex. 9 | Ex. 10 | Ex. 11 | Ex. 12 | Comp. Ex. 4 | Comp. Ex. 5 | Comp. Ex. 6 |
|---|---|---|---|---|---|---|---|---|
| Resin Composition | Propylene.ethylene.butene copolymer (S-3) | 90 | 80 |  |  |  |  |  |
|  | Propylene.ethylene.butene copolymer (S-4) |  |  | 80 |  |  |  |  |
|  | Propylene.ethylene.butene copolymer (S-5) |  |  |  | 80 |  |  |  |
|  | Propylene.butene copolymer (S-10) |  |  |  |  | 80 |  |  |
|  | Propylene.ethylene copolymer (S-11) |  |  |  |  |  | 80 |  |
|  | Propylene.ethylene.butene butene copolymer (S-12) |  |  |  |  |  |  | 80 |
|  | Sindio-PP (IIb) | 10 | 20 | 20 | 20 | 20 | 20 | 20 |
| Properties of resin composition | Tensile modulus (MPa) | 7 | 24 | 17 | 17 | 164 | 19 | 19 |
|  | TMA (° C.) | 106 | 116 | 114 | 100 | 120 | 102 | 102 |
|  | ΔGloss (%) | 9 | 5 | 6 | 16 | 5 | 25 | 35 |
|  | Permanent set (%) | 6 | 8 | 8 | 10 | 28 | 8 | 14 |
|  | JIS A hardness | 74 | 83 | 80 | 80 | ≧95 | 81 | 81 |
|  | Haze | 7 | 10 | 10 | 20 | 14 | 8 | 38 |

Example 13

A polypropylene resin composition was obtained by mixing 80 parts by weight of the syndiotactic polypropylene (A-1) obtained in Synthesis Example 13 and 20 parts by weight of the propylene•butene copolymer (S-6) obtained in Synthesis Example 6, and melt kneading the mixture. The obtained properties are presented in Table 4.

Example 14

A polypropylene resin composition was obtained in the same manner as in Example 13, except that the propylene•butene copolymer (S-7) obtained in Synthesis Example 7 was used instead of the propylene•butene copolymer (S-6) obtained in Synthesis Example 6. The obtained properties are presented in Table 4.

Example 15

A polypropylene resin composition was obtained in the same manner as in Example 13, except that the propylene•butene copolymer (S-8) obtained in Synthesis Example 8 was used instead of the propylene•butene copoly- Example 18

A polypropylene resin composition was obtained in the same manner as in Example 17, except that the propylene•butene copolymer (S-8) obtained in Synthesis Example 8 was used instead of the propylene•butene copolymer (S-7) obtained in Synthesis Example 7. The obtained properties are presented in Table 4.

Example 19

A polypropylene resin composition was obtained in the same manner as in Example 17, except that the propylene•octene copolymer (S-9) obtained in Synthesis Example 9 was used instead of the propylene•butene copolymer (S-7) obtained in Synthesis Example 7. The obtained properties are presented in Table 4.

Example 20

A polypropylene resin composition was obtained by mixing 70 parts by weight of an isotactic polypropylene block copolymer (grade: J736, MFR=26.0, ethylene content=2.6% by weight, melting point 164° C.) (A-3) manufactured by Mitsui Chemicals, Inc., 10 parts by weight of the propylene•butene copolymer (S-8) obtained Synthesis Example 8, and 20 parts by weight of an ethylene•butene copolymer (grade: A4070, MFR=7.1, ethylene content=84.1% by mole) (C-1) manufactured by Mitsui Chemicals, Inc., and melt kneading the mixture. The obtained properties are presented in Table 4.

Example 21

A polypropylene resin composition was obtained in the same manner as in Example 17, except that the propylene•ethylene•butene copolymer (S-1) obtained in Synthesis Example 1 was used instead of the propylene•butene copolymer (S-7) obtained in Synthesis Example 7. The obtained properties are presented in Table 4.

Example 22

A polypropylene resin composition was obtained in the same manner as in Example 17, except that the propylene•ethylene•butene copolymer (S-2) obtained in Synthesis Example 2 was used instead of the propylene•butene copolymer (S-7) obtained in Synthesis Example 7. The obtained properties are presented in Table 4.

Comparative Example 7

A polypropylene resin composition was obtained in the same manner as in Example 17, except that the propylene•ethylene copolymer (S-11) obtained in Synthesis Example 11 was used instead of the propylene•butene copolymer (S-7) obtained in Synthesis Example 7. The obtained properties are presented in Table 4.

Comparative Example 8

A polypropylene resin composition was obtained by mixing 70 parts by weight of an isotactic polypropylene block copolymer (grade J736, MFR=26.0, ethylene content=2.6% by weight, melting point 164° C.) (A-3) manufactured by Mitsui Chemicals, Inc., and 30 parts by weight of an ethylene•butene copolymer (grade: A4070, MFR=7.1, ethylene content=84.1% by mole) (C-1) manufactured by Mitsui Chemicals, Inc., and melt kneading the mixture. The obtained properties are presented in Table 4.

TABLE 4

| Item | Ex. 13 | Ex. 14 | Ex. 15 | Ex. 16 | Ex. 17 | Ex. 18 | Ex. 19 | Ex. 20 | Ex. 21 | Ex. 22 | Comp. Ex. 7 | Comp. Ex. 8 |
|---|---|---|---|---|---|---|---|---|---|---|---|---|
| Syndiotactic polypropylene (A-1) | 80 | 80 | 80 | 80 | | | | | 80 | | | |
| Isotactic polypropylene random copolymer (A-2) | | | | | 80 | 80 | 80 | | 80 | | 80 | |
| Isotactic polypropylene block copolymer (A-3) | | | | | | | | 70 | | | | 70 |
| Propylene.butene copolymer (S-6) | 20 | | | | | | | | | | | |
| Propylene.butene copolymer (S-7) | | 20 | | 20 | | | | | | | | |
| Propylene.butene copolymer (S-8) | | | 20 | | 20 | | 10 | | | | | |
| Propylene.octene copolymer (S-9) | | | | 20 | | 20 | | | | | | |
| Propylene.ethylene copolymer (S-11) | | | | | | | | | | | 20 | |
| Propylene.ethylene.butene copolymer (S-1) | | | | | | | | | 20 | | | |
| Propylene.ethylene.butene copolymer (S-2) | | | | | | | | | | 20 | | |
| Ethylene.butene random copolymer (C-1) | | | | | | | | 20 | | | | 30 |
| Tensile modulus (YM) (MPa) | 440 | 420 | 410 | 370 | 570 | 550 | 520 | 1200 | 470 | 390 | 590 | 1000 |
| Transparency (Haze) (%) | 12 | 10 | 12 | 10 | 25 | 15 | 14 | 75 | 15 | 10 | 86 | 92 |
| Abrasion resistance (ΔGloss) (%) | 3 | 3 | 3 | 5 | 3 | 3 | 5 | 12 | 3 | 3 | 3 | 29 |
| TMA (° C.) | 127 | 127 | 127 | 127 | 138 | 138 | 137 | 165 | 138 | 127 | 125 | 165 |
| Whitening resistance | ◯ | ◯ | ◯ | ◯ | ◯ | ◯ | ◯ | ◯ | ◯ | ◯ | X | X |
| Izod impact strength (0° C., J/m) | 38 | 48 | 60 | 74 | 54 | 72 | 81 | | 74 | 62 | 81 | |
| Izod impact strength (−30° C., J/m) | | | | | | | | 29 | | | | 32 |
| Heat sealability (90° C.) (N/15 mm) | 2.6 | 2.9 | 2.8 | 3.2 | 2.9 | 2.9 | 3.1 | | 2.9 | 3.2 | 0.4 | |

Example 23

A propylene-based polymer composition was obtained by adding 8 parts by weight of the syndiotactic homopolypropylene (Y-1) obtained in Synthesis Example 13 and 32 parts by weight of the propylene•ethylene•butene copolymer (S-2) obtained Synthesis Example 2, to 60 parts by weight of a non-crosslinked or partially crosslinked olefin-based thermoplastic elastomer manufactured by Mitsui Chemicals, Inc., Mirastomer-5030N (including 15% by weight of isotactic polypropylene and 50% by weight of an ethylene•α-olefin having 3 or more carbon atoms•non-conjugated polyene copolymer), and melt kneading the mixture. The obtained composition was subjected to melt press molding at 200° C., and evaluation was performed for the properties with a desired testing form. The results of the properties evaluation are presented in Table 5.

The tensile modulus of this composition was 10 MPa, the TMA was 145° C., the gloss change rate, ΔGloss, before and after abrasion was 15, the permanent elongation was 7, and the JIS A hardness was 83.

Example 24

A propylene-based polymer composition was obtained in the same manner as in Example 23, except that the propylene•ethylene•butene copolymer (S-2) obtained in Synthesis Example 2 was change to the propylene•ethylene•butene copolymer (S-1) obtained in Synthesis Example 1. The obtained composition was subjected to melt press molding at 200° C., and evaluation was performed for the properties with a desired testing form. The results of the properties evaluation are presented in Table 5.

The tensile modulus of this composition was 13 MPa, the TMA was 144° C., the gloss change rate, ΔGloss, before and after abrasion was 14, the permanent elongation was 8, and the JIS A hardness was 84.

Example 25

A propylene-based polymer composition was obtained in the same manner as in Example 23, except that the propylene•ethylene•butene copolymer (S-2) obtained in Synthesis Example 2 was change to the propylene•ethylene•butene copolymer (S-3) obtained in Synthesis Example 3. The obtained composition was subjected to melt press molding at 200° C., and evaluation was performed for the properties with a desired testing form. The results of the properties evaluation are presented in Table 5.

The tensile modulus of this composition was 14 MPa, the TMA was 145° C., the gloss change rate, ΔGloss, before and after abrasion was 12, the permanent elongation was 7, and the JIS A hardness was 84.

Example 26

A propylene-based polymer composition was obtained in the same manner as in Example 23, except that the propylene•ethylene•butene copolymer (S-2) obtained in Synthesis Example 2 was change to the propylene•ethylene•butene copolymer (S-4) obtained in Synthesis Example 4. The obtained composition was subjected to melt press molding at 200° C., and evaluation was performed for the properties with a desired testing form. The results of the properties evaluation are presented in Table 5.

The tensile modulus of this composition was 12 MPa, the TMA was 145° C., the gloss change rate, ΔGloss, before and after abrasion was 9, the permanent elongation was 7, and the JIS A hardness was 82.

Example 27

A propylene-based polymer composition was obtained in the same manner as in Example 23, except that the propylene•ethylene•butene copolymer (S-2) obtained in Synthesis Example 2 was change to the propylene•butene copolymer (S-6) obtained in Synthesis Example 6. The obtained composition was subjected to melt press molding at 200° C., and evaluation was performed for the properties with a desired testing form. The results of the properties evaluation are presented in Table 5.

The tensile modulus of this composition was 53 MPa, the TMA was 155° C., the gloss change rate, ΔGloss, before and after abrasion was 9, the permanent elongation was 12, and the JIS A hardness was 91.

Example 28

A propylene-based polymer composition was obtained by mixing 68 parts by weight of a non-crosslinked or partially crosslinked olefin-based thermoplastic elastomer manufactured by Mitsui Chemicals, Inc., Mirastomer-5030N, and 32 parts by weight of the propylene•ethylene•butene copolymer (S-2) obtained by Synthesis Example 2, and melt kneading the mixture. The obtained composition was subjected to melt press molding at 200° C., and evaluation was performed for the properties with a desired testing form. The results of the properties evaluation are presented in Table 5.

The tensile modulus of this composition was 8 MPa, the TMA was 142° C., the gloss change rate, ΔGloss, before and after abrasion was 18, the permanent elongation was 7, and the JIS A hardness was 80.

Example 29

A propylene-based polymer composition was obtained in the same manner as in Example 28, except that the propylene•ethylene•butene copolymer (S-2) obtained in Synthesis Example 2 was changed to the propylene•ethylene•butene copolymer (S-4) obtained in Synthesis Example 4. The obtained composition was subjected to melt press molding at 200° C., and evaluation was performed for the properties with a desired testing form. The results of the properties evaluation are presented in Table 5.

The tensile modulus of this composition was 11 MPa, the TMA was 142° C., the gloss change rate, ΔGloss, before and after abrasion was 15, the permanent elongation was 9, and the JIS A hardness was 78.

Example 30

A propylene-based polymer composition was obtained in the same manner as in Example 28, except that the propylene•ethylene•butene copolymer (S-2) obtained in Synthesis Example 2 was changed to the propylene•butene copolymer (S-6) obtained in Synthesis Example 6. The obtained composition was subjected to melt press molding at 200° C., and evaluation was performed for the properties with a desired testing form. The results of the properties evaluation are presented in Table 5.

The tensile modulus of this composition was 47 MPa, the TMA was 141° C., the gloss change rate, ΔGloss, before and after abrasion was 17, the permanent elongation was 12, and the JIS A hardness was 90.

Example 31

A propylene-based polymer composition was obtained by adding 6 parts by weight of an isotactic polypropylene polymer (Y-2) (grade: B101, MFR=0.5 g/10 min, melting point 165° C.) manufactured by Mitsui Chemicals, Inc., and 24 parts by weight of the propylene•ethylene•butene copolymer (S-2) obtained Synthesis Example 2, to 70 parts by weight of a non-crosslinked or partially crosslinked olefin-based thermoplastic elastomer manufactured by Mitsui Chemicals, Inc., Milastomer-5030N (including 15% by weight of isotactic polypropylene and 50% by weight of an ethylene•α-olefin having 3 or more carbon atoms•non-conjugated polyene copolymer), and melt kneading the mixture. The obtained composition was subjected to melt press molding at 200° C., and evaluation was performed for the properties with a desired testing form. The results of the properties evaluation are presented in Table 5.

The tensile modulus of this composition was 27 MPa, the TMA was 154° C., the gloss change rate, ΔGloss, before and after abrasion was 14, the permanent elongation was 8, and the JIS A hardness was 86.

Example 32

A propylene-based polymer composition was obtained in the same manner as in Example 31, except that the propylene•ethylene•butene copolymer (S-2) obtained in Synthesis Example 2 was changed to the propylene•butene copolymer (S-4) obtained in Synthesis Example 4. The obtained composition was subjected to melt press molding at 200° C., and evaluation was performed for the properties with a desired testing form. The results of the properties evaluation are presented in Table 5.

The tensile modulus of this composition was 29 MPa, the TMA was 154° C., the gloss change rate, ΔGloss, before and after abrasion was 11, the permanent elongation was 9, and the JIS A hardness was 86.

Example 33

A propylene-based polymer composition was obtained in the same manner as in Example 32, except that the amount of the non-crosslinked or partially crosslinked olefin-based thermoplastic elastomer manufactured by Mitsui Chemicals, Inc., Mirastomer-5030N was changed to 50 parts by weight, the amount of the isotactic polypropylene polymer (grade: B101, MFR=0.5 g/10 min, melting point 165° C.) manufactured by Mitsui Chemicals, Inc. was changed to 10 parts by weight; and the propylene•ethylene•butene copolymer (S-4) obtained in Synthesis Example 4 was changed to 40 parts by weight. The obtained composition was subjected to melt press molding at 200° C., and evaluation was performed for the properties with a desired testing form. The results of the properties evaluation are presented in Table 5.

The tensile modulus of this composition was 21 MPa, the TMA was 154° C., the gloss change rate, ΔGloss, before and after abrasion was 10, the permanent elongation was 10, and the JIS A hardness was 84.

Comparative Example 9

A non-crosslinked or partially crosslinked olefin-based thermoplastic elastomer manufactured by Mitsui Chemicals, Inc., Mirastomer-5030N, was subjected to melt press molding at 200° C., and evaluation was performed for the properties with a desired testing form. The results of the properties evaluation are presented in Table 5.

The tensile modulus of this composition was 3 MPa, the TMA was 154° C., the gloss change rate, ΔGloss, before and after abrasion was 96, the permanent elongation was 8, and the JIS A hardness was 50.

TABLE 5

|  |  | Ex. 23 | Ex. 24 | Ex. 25 | Ex. 26 | Ex. 27 | Ex. 28 | Ex. 29 | Ex. 30 | Ex. 31 | Ex. 32 | Ex. 33 | Comp. Ex. 9 |
|---|---|---|---|---|---|---|---|---|---|---|---|---|---|
| Resin composition | Thermoplastic elastomer | 60 | 60 | 60 | 60 | 60 | 60 | 68 | 68 | 70 | 70 | 50 | 100 |
|  | Syndiotactic homopolypropylene (Y-1) | 8 | 8 | 8 | 8 | 8 |  |  |  |  |  |  |  |
|  | Isotactic polypropylene polymer (Y-2) |  |  |  |  |  |  |  |  | 6 | 6 | 10 |  |
|  | Propylene.ethylene.butene copolymer (S-2) | 32 |  |  |  |  | 32 |  |  | 24 |  |  |  |
|  | Propylene.ethylene.butene copolymer (S-1) |  | 32 |  |  |  |  |  |  |  |  |  |  |
|  | Propylene.ethylene.butene copolymer (S-3) |  |  | 32 |  |  |  |  |  |  |  |  |  |
|  | Propylene.ethylene.butene copolymer (S-4) |  |  |  | 32 |  |  | 32 |  |  | 24 | 40 |  |
|  | Propylene.ethylene.butene copolymer (S-6) |  |  |  |  | 32 |  |  | 32 |  |  |  |  |
| Properties of resin composition | Tensile modulus (MPa) | 10 | 13 | 14 | 12 | 53 | 8 | 11 | 47 | 27 | 29 | 21 | 3 |
|  | TMA (° C.) | 145 | 144 | 145 | 145 | 155 | 142 | 141 | 141 | 154 | 154 | 154 | 154 |
|  | ΔGloss (%) | 15 | 14 | 12 | 9 | 9 | 18 | 15 | 17 | 14 | 11 | 10 | 96 |
|  | Permanent elongation (%) | 7 | 8 | 7 | 7 | 12 | 7 | 9 | 12 | 8 | 9 | 10 | 8 |
|  | JIS A hardness | 83 | 84 | 84 | 82 | 91 | 80 | 78 | 90 | 86 | 86 | 84 | 50 |

INDUSTRIAL APPLICABILITY

According to the present invention, a thermoplastic resin composition excellently balanced in transparency, flexibility, rubber elasticity, thermal resistance and abrasion resistance, and a molded product obtained therefrom are provided.

According to the present invention, an α-olefin-based copolymer which can provide a thermoplastic resin composition excellently balanced in transparency, flexibility, heat sealability and impact resistance when blended with a thermoplastic resin, is provided.

According to the present invention, a polypropylene resin composition which has excellent rigidity and impact resistance, and is excellently balanced in whitening resistance, abrasion resistance and heat sealability, is also provided.

Furthermore, according to the present invention, a propylene-based copolymer composition having excellent rubbery properties (permanent elongation, permanent compression set, etc.) and thermal resistance as well as abrasion and scratch resistance, is provided.

The thermoplastic resin composition provided by the present invention can be widely used for the conventionally known applications of polyolefin, but particularly, can be suitably used after molding into molded products of various shapes such as sheet, unstretched or stretched film, pipe, wire coating, filament and the like.

The invention claimed is:

1. A thermoplastic resin composition comprising:
an α-olefin-based copolymer (I), which comprises 1 to 30% by mole of an ethylene-derived constituent unit, 30 to 69% by mole of a propylene-derived constituent unit, and 10 to 50% by mole of a constituent unit derived from an α-olefin having 4 to 20 carbon atoms, and wherein the total amount of the ethylene-derived constituent unit and the constituent unit derived from an a-olefin having 4 to 20 carbon atoms is 31 to 70% by mole, and for which, in a signal chart measured by $^{13}$C-NMR in an o-dichlorobenzene solution and predetermined such that the peak present at the highest magnetic field among the signals originating from CH (methine) of the constituent unit derived from an a-olefin having 4 to 20 carbon atoms is to be at 34.4 ppm, an absorption intensity A at about 22.0 to 20.9 ppm and an absorption intensity B at about 19.0 to 20.6 ppm satisfy the following relational expressions (i) and (ii) with respect to the absorption intensity C at about 19.0 to 22.0 ppm, which is assignable to propylene methyl:

$(A/C) \times 100 \leq 8$     (i)

$(B/C) \times 100 \geq 60$     (ii), and an other thermoplastic resin (II).

2. The thermoplastic resin composition according to claim 1, wherein the α-olefin-based copolymer (I) does not have a melting peak as measured by differential scanning calorimetry (DSC), and has an intrinsic viscosity [η] of 0.01 to 10 dl/g as measured at 135° C. in decalin, a molecular weight distribution of 4 or less as determined by GPC, and a glass transition temperature Tg of -5° C. or lower.

3. The thermoplastic resin composition according to claim 1, wherein the other thermoplastic resin (II) is a polypropylene having a melt flow rate in the range of 0.1 to 200 g/10 min as measured at 230° C. under a load of 2.15 kg.

4. A molded product obtained from the thermoplastic resin composition according to claim 1.

5. The thermoplastic resin composition according to claim 1, wherein the α-olefin-based copolymer (I) is obtained by polymerizing ethylene, propylene and an a-olefin having 4 to 20 carbon atoms in the presence of a catalyst containing a transition metal compound represented by the following formula (1);

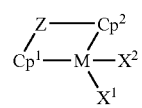
(1)

wherein M is Ti, Zr, Hf, Rn, Nd, Sm or Ru; $Cp^1$ and $Cp^2$, which are different from each other, are each a cyclopentadienyl group, an indenyl group, a fluorenyl group or a derivative group thereof, which are π-bonded to M; $X^1$ and $X^2$ are each an anionic ligand or a neutral Lewis base ligand; and Z is a C, O, B, S, Ge, Si or Sn atom, or a group containing these atoms.

6. An α-olefin-based copolymer (I) which comprises 1 to 30% by mole of an ethylene-derived constituent unit, 30 to 69% by mole of a propylene-derived constituent unit, and 10 to 50% by mole of a constituent unit derived from an α-olefin having 4 to 20 carbon atoms, and wherein the total amount of the ethylene-derived constituent unit and the constituent unit derived from an α-olefin having 4 to 20 carbon atoms is 31 to 70% by mole, and for which, in a signal chart measured by $^{13}$C-NMR in an o-dichlorobenzene solution and predetermined such that the peak present at the highest magnetic field among the signals originating from CH (methine) of the constituent unit derived from an a-olefm having 4 to 20 carbon atoms is to be at 34.4 ppm, an absorption intensity A at about 22.0 to 20.9 ppm and an absorption intensity B at about 19.0 to 20.6 ppm satisfy the following relational expressions (i) and (ii) with respect to an absorption intensity C at about 19.0 to 22.0 ppm, which is assignable to propylene methyl:

$(A/C) \times 100 \leq 8$     (i), and $(B/C) \times 100 \geq 60$     (ii).

7. The a-olefin-based copolymer (I) according to claim 6 which is obtained by polymerizing ethylene, propylene and an α-olefin having 4 to 20 carbon atoms in the presence of a catalyst containing a transition metal compound represented by the following formula (1);

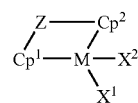
(1)

wherein M is Ti, Zr, Hf, Rn, Nd, Sm or Ru; $Cp^1$ and $Cp^2$, which are different from each other, are each a cyclopentadienyl group, an indenyl group, a fluorenyl group or a derivative group thereof, which are π-bonded to M; $X^1$ and $X^2$ are each an anionic ligand or a neutral Lewis base ligand; and Z is a C, O, B, S, Ge, Si or Sn atom, or a group containing these atoms.

* * * * *

UNITED STATES PATENT AND TRADEMARK OFFICE
CERTIFICATE OF CORRECTION

| | | |
|---|---|---|
| PATENT NO. | : 7,847,040 B2 | Page 1 of 1 |
| APPLICATION NO. | : 11/578972 | |
| DATED | : December 7, 2010 | |
| INVENTOR(S) | : Ryoji Mori et al. | |

It is certified that error appears in the above-identified patent and that said Letters Patent is hereby corrected as shown below:

Title Page, Item (73) Assignee should read as:

(73)  MITSUI CHEMICALS, INC.

Signed and Sealed this

Seventeenth Day of May, 2011

David J. Kappos
*Director of the United States Patent and Trademark Office*